(12) United States Patent
Mihajlovic et al.

(10) Patent No.: US 10,986,413 B2
(45) Date of Patent: Apr. 20, 2021

(54) METHOD AND SYSTEM FOR DELIVERING AN INTERACTIVE VIDEO

(71) Applicant: FLAVOURWORKS LTD, Chichester (GB)

(72) Inventors: Pavle Mihajlovic, London (GB); Jack Attridge, Chichester (GB)

(73) Assignee: FLAVOURWORKS, LTD., West Sussex (GB)

( * ) Notice: Subject to any disclaimer, the term of this patent is extended or adjusted under 35 U.S.C. 154(b) by 0 days.

(21) Appl. No.: 16/311,997

(22) PCT Filed: Jun. 20, 2017

(86) PCT No.: PCT/GB2017/051798
§ 371 (c)(1),
(2) Date: Dec. 20, 2018

(87) PCT Pub. No.: WO2017/220992
PCT Pub. Date: Dec. 28, 2017

(65) Prior Publication Data
US 2019/0215571 A1    Jul. 11, 2019

(30) Foreign Application Priority Data

Jun. 20, 2016    (GB) ..................... 1610752

(51) Int. Cl.
*H04N 21/478*    (2011.01)
*H04N 21/8541*   (2011.01)
*G06T 13/80*     (2011.01)
*H04N 21/422*    (2011.01)
*H04N 21/4725*   (2011.01)

(52) U.S. Cl.
CPC ......... *H04N 21/4781* (2013.01); *G06T 13/80* (2013.01); *H04N 21/42204* (2013.01); *H04N 21/4725* (2013.01); *H04N 21/8541* (2013.01)

(58) Field of Classification Search
None
See application file for complete search history.

(56) References Cited

U.S. PATENT DOCUMENTS

| 5,462,275 | A  | 10/1995 | Lowe et al. |
| 6,600,491 | B1 | 7/2003  | Szeliski et al. |
| 8,142,289 | B2 * | 3/2012 | Gutmann ............... G07F 17/32 463/42 |

(Continued)

FOREIGN PATENT DOCUMENTS

WO    2014/188235    11/2014

OTHER PUBLICATIONS

International Search Report for PCT/GB2017/051798, dated Aug. 31, 2017, 3 pages.

*Primary Examiner* — Seng H Lim
(74) *Attorney, Agent, or Firm* — Nixon & Vanderhye, P.C.

(57) ABSTRACT

The present invention relates to methods for creating and delivering an interactive video including a first sequence of frames based on a first video. A last delivered frame of the first sequence of frames is delivered. An updated input corresponding to an updated path position within a first video path is received. At least one frame is selected for inclusion in the first sequence of frames based on the last delivered frame and the updated path position, and the at least one frame is delivered.

33 Claims, 17 Drawing Sheets

(56) References Cited

U.S. PATENT DOCUMENTS

| | | | | |
|---|---|---|---|---|
| 8,734,258 B2* | 5/2014 | Gutmann | ............... | G07F 17/32 |
| | | | | 463/42 |
| 8,873,930 B2* | 10/2014 | Deglise | ............ | H04N 21/47217 |
| | | | | 386/241 |
| 9,550,112 B2* | 1/2017 | Gutmann | ............... | G07F 17/32 |
| 2011/0050608 A1* | 3/2011 | Homma | ............... | G06F 3/0488 |
| | | | | 345/173 |
| 2012/0079386 A1* | 3/2012 | Kim | ..................... | G06F 3/0485 |
| | | | | 715/720 |
| 2013/0097643 A1 | 4/2013 | Stone et al. | | |
| 2013/0307792 A1* | 11/2013 | Andres | ............... | G11B 27/005 |
| | | | | 345/173 |
| 2014/0029914 A1* | 1/2014 | Deglise | ............... | G11B 27/034 |
| | | | | 386/241 |
| 2017/0244894 A1* | 8/2017 | Aggarwal | .......... | G06K 9/00744 |
| 2017/0244984 A1* | 8/2017 | Aggarwal | ........... | G11B 27/036 |
| 2017/0352378 A1* | 12/2017 | Mitchard | ............... | G06F 3/041 |

* cited by examiner

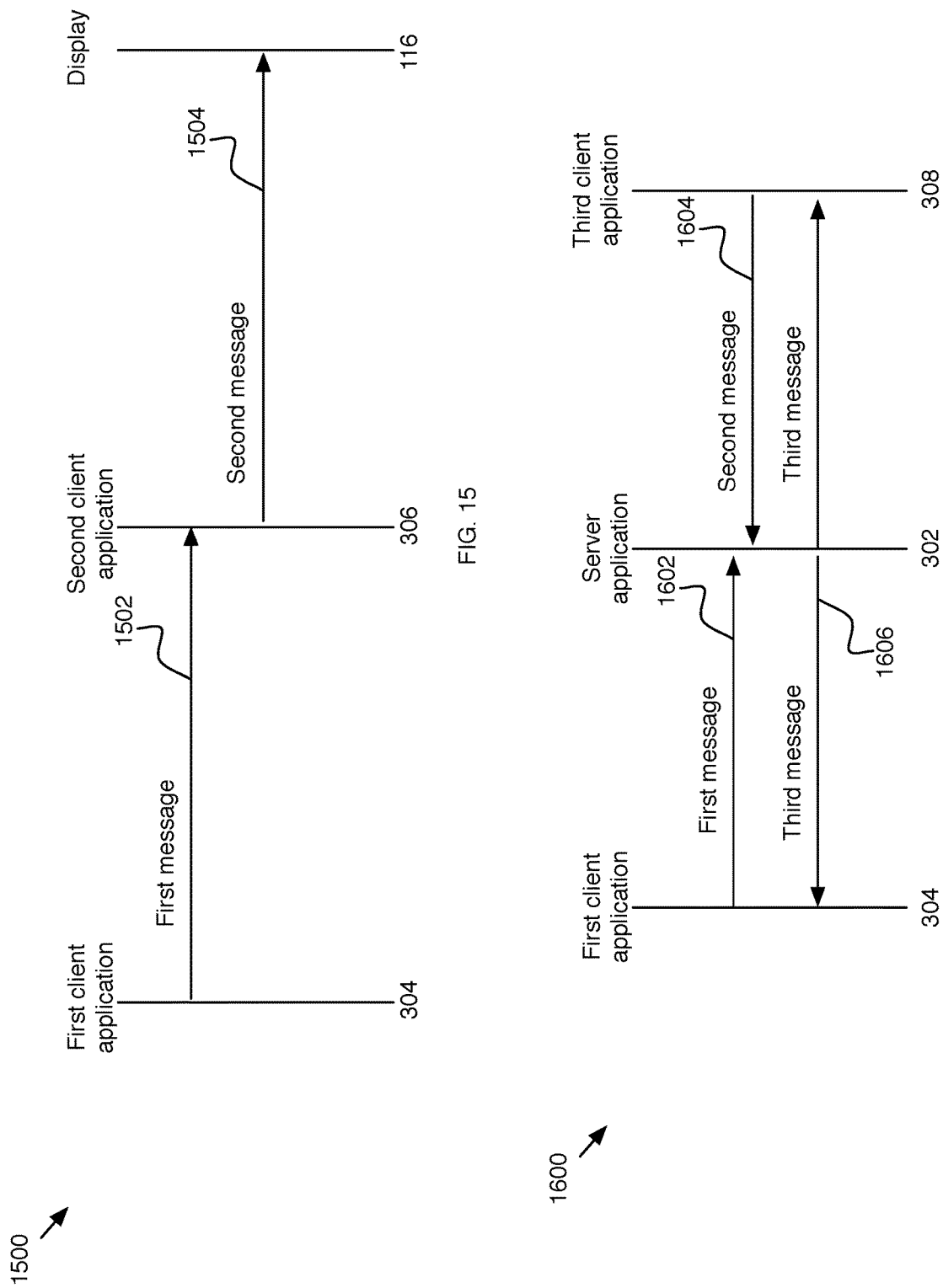

METHOD AND SYSTEM FOR DELIVERING AN INTERACTIVE VIDEO

This application is the U.S. national phase of International Application No. PCT/GB2017/051798 filed 20 Jun. 2017, which designated the U.S. and claims priority to GB Patent Application No. 1610752.6 filed 20 Jun. 2016, the entire contents of each of which are hereby incorporated by reference.

FIELD

The present application is in the field of delivering video. More particularly, but not exclusively, the present application relates to interactive video.

BACKGROUND

Interactive video utilizes dynamic input to determine what video frames and/or video content is delivered. Interactive video can be used in entertainment, education, and gaming.

Previous methods of creating interactive content have used entirely computer-generated methods, including generating sprites, vectors, or 3d models, to produce video in response to real-time inputs. Computer-generated graphics can create precise event sequences in response to, for example, a user's input in a video game. Creating high-quality graphics that are realistic and engaging with computer-generated methods is processor-intensive, inefficient, and slow, however. For these reasons, higher quality interactive computer-generated graphics typically can only be accessed with computers that include advanced graphics processing units, such as desktop computers.

Previously, users have not been able to access higher quality interactive content using the lower performing hardware available on a smartphone or tablet computer, however, which offer more limited graphics processing units, and limited battery life.

In addition, creating high-quality interactive content including computer-generated graphics has entailed a tremendous cost and complexity for content creators. The expense and technical complexity required may bar those who would like to create high quality interactive video content from using computer-generated methods.

Rather than relying on computer-generated graphics rendered in real time to create interactive content, it is possible to use at least some previously generated video files. By providing previously generated video clips, such as live action video, this may avoid the need to dynamically render processor-intensive graphics in response to user inputs. The pre-generated videos can also use real actors and props, which can make interactive content appear more realistic than those using computer-generated graphics.

Creating interactive videos based on previously generated video clips requires the dynamic integration of multiple pre-recorded clips in response to real-time user inputs. Previous products, however, have not allowed a user to change the video content displayed dynamically in response to real time inputs.

It is an object of the present invention to provide a method for delivering an interactive video that overcomes the disadvantages of the prior art, or at least provides a useful alternative.

SUMMARY OF INVENTION

According to a first aspect of the invention there is provided a method for delivering an interactive video including a first sequence of frames based on a first video, the method comprising:

determining a last delivered frame of the first sequence of frames;
receiving an updated input corresponding to an updated path position within a first video path;
selecting at least one frame for inclusion in the first sequence of frames based on the last delivered frame, and the updated path position; and
delivering the at least one frame.

According to a further aspect, the first video may include live action video.

According to a further aspect, the first sequence of frames may include a sub-sequence of frames from the first video.

According to a further aspect, the updated input may be within an engageable region of the first video path.

According to a further aspect, the engageable region may be dependent on a video path position.

According to a further aspect, the updated input may be further received within an engageable time period after a previous input.

According to a further aspect, delivering the at least one frame may include delivering an engageable region clue.

According to a further aspect, the updated input may be received via a touch screen, a mouse, a pressure sensing device, an accelerometer, a gyroscope, a gesture recognition device, a joystick, or a game controller.

According to a further aspect, the last delivered frame of the first sequence of frames may correspond to a previous path position, and selecting the at least one additional frame may be further based on a path distance between the previous path position and the updated path position.

According to a further aspect, the updated input may include a first updated coordinate and a second updated coordinate, the updated path position may further include a first updated path position corresponding to the first updated coordinate and a second updated path position corresponding to the second updated coordinate, and the at least one frame may be further based on a path difference between the first updated path position and the second updated path position.

According to a further aspect, selecting the at least one frame for inclusion in the first sequence of frames may be further based on a previous path position.

According to a further aspect, the engageable region may be based on the last delivered frame.

According to a further aspect, the last delivered frame and the at least one frame may include a begin frame and an end frame of the first video.

The method may further include the steps of:
determining an input velocity based on the updated path position, the previous path position, and an input interval, wherein selecting the at least one frame may be further based on the input velocity.

According to a further aspect, wherein selecting the at least one frame may further comprises:
skipping the delivery of at least one first video frame in response to determining that the input velocity is greater than a threshold velocity.

The method may further include the steps of:
in response to determining that the input velocity is less than the threshold velocity, delivering a first frame based on a first video frame, delivering a second frame based on a second video frame, the second video frame adjacent to the first video frame in the first video, and delivering at least one additional frame between the first video frame and the second video frame.

According to a further aspect, the at least one additional frame may be an interpolated frame based on at least one of the first frame or the second frame.

According to a further aspect, the at least one interpolated frame may include a fading effect.

According to a further aspect, a degree of fading applied in the fading effect may be based on the input velocity and the first video object velocity.

The method may further include the step of:
delivering an audio track, wherein at least one of a pitch or a volume of the audio track is determined by the input velocity.

The method may further include the step of:
upon determining that there is no subsequent input, delivering an exit audio track.

The method may further include the step of:
selecting the first video from a plurality of videos based on a further input.

The method may further include the steps of:
determining that the updated path position is not an equilibrium path position;
selecting one or more equilibrium-restoring frames for inclusion in the first sequence of frames based on the updated path position and the equilibrium path position; and delivering the equilibrium-restoring frames.

According to a further aspect, a final frame of the one or more equilibrium-restoring frames may correspond to the equilibrium path position.

According to a further aspect, a first intermediate frame of the equilibrium-restoring frames may correspond to the equilibrium path position and a second intermediate frame of the equilibrium-restoring frames may correspond to an overshot path position opposite the equilibrium path position from the updated path position.

According to a further aspect, selecting the at least one frame for inclusion in the first sequence of frames may be further based on a simulated physics in the first video path.

According to a further aspect, the simulated physics in the first video path may include at least one of: a dampening effect or a spring effect.

According to a further aspect, selecting the at least one frame for inclusion in the first sequence of frames may be further based on the last delivered frame, and the method may further include:
determining that the updated path position is not a final path position based on the simulated physics;
selecting one or more final approach frames for inclusion in the first sequence of frames based on the updated path position and the simulated physics; and delivering the one or more final approach frames.

According to a further aspect, a first intermediate frame of the one or more final approach frames may correspond to the updated path position and a second intermediate frame of the final approach frames may correspond to an overshot path position opposite the updated path position from the previous path position.

According to a further aspect, the one or more final approach frames may not include a frame corresponding to the updated path position.

According to a further aspect, the one or more final approach frames may include a frame corresponding to the equilibrium path position.

The method may further include the step of:
upon determining that there is no subsequent input, delivering the first video at a constant playback speed.

The method may further include the step of:
delivering a background in a background area, wherein the interactive video delivers the first sequence of frames in an interactive video area.

According to a further aspect, delivering the background may include delivering a background video.

According to a further aspect, delivering the background video may include playing the background video in a loop.

According to a further aspect, the interactive video area may move relative to the video display.

According to a further aspect, the background area may move relative to the video display.

According to a further aspect, the interactive video may further include delivering a second sequence of frames based on a second video in a second area.

According to a further aspect, delivering the at least one frame may include displaying the at least one frame.

According to a further aspect, the updated input may be received at a first client application from a second client application.

According to a further aspect, the updated input may correspond to the updated path position within the first video path is received at a server application.

According to a further aspect, there may be a system for delivering an interactive video including a first sequence of frames based on a first video via a method as claimed in any one of the methods of the first aspect.

According to a further aspect, there may be a computer program configured to perform a method as claimed in any one of the methods of the first aspect.

According to a further aspect, there may be an electronically readable medium storing a computer program as claimed in any one of the methods of the first aspect.

According to a second aspect of the invention there is provided a method for creating an interactive video as claimed in the first aspect, the method including:
providing instructions to deliver a first video;
providing instructions for a video path; and
providing instructions to wait for an updated input and deliver at least one frame in response to the updated input.

According to a further aspect, there may be a system for creating an interactive video via a method as claimed in any method of the second aspect.

According to a further aspect, there may be a computer program configured to perform a method as claimed in any method of the second aspect.

According to a further aspect, there may be an electronically readable medium storing a computer program as claimed in any method of the second aspect.

Other aspects of the invention are described within the claims.

BRIEF DESCRIPTION OF THE DRAWINGS

Embodiments of the invention will now be described, by way of example only, with reference to the accompanying drawings in which:

FIG. 15: depicts sequence diagram 1500, in accordance with an embodiment of the invention;

FIG. 16: depicts sequence diagram 1600, in accordance with an embodiment of the invention.

DETAILED DESCRIPTION OF PREFERRED EMBODIMENTS

The present invention provides a method, system, and computer program to facilitate the creation and delivery of an interactive video.

Figure 1:
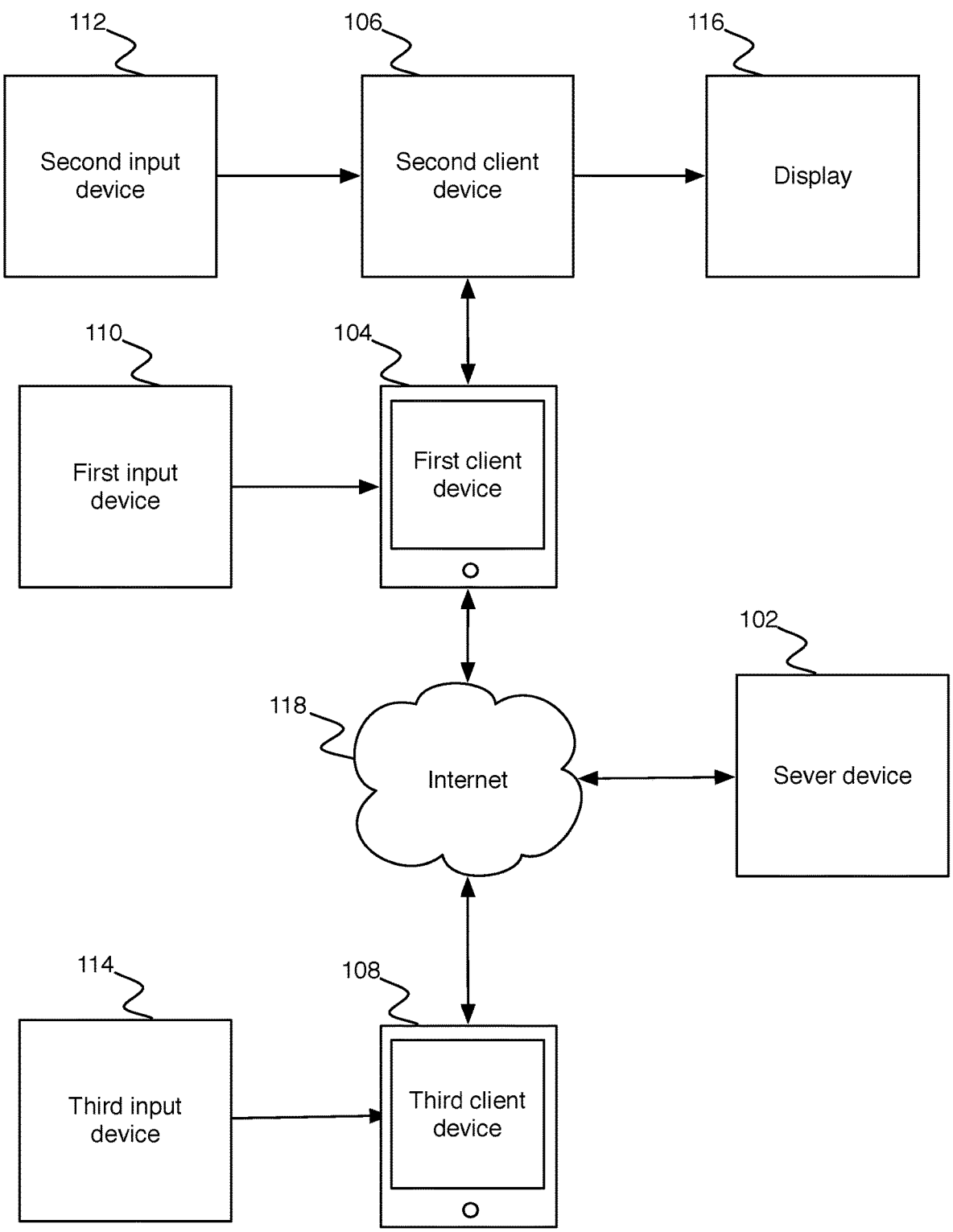
FIG. 1: depicts system 100, in accordance with an embodiment of the invention.

FIG. 1 depicts a system 100 in accordance with an embodiment. System 100 includes first client device 104. System 100 may further include server 102, second client device 106, third client device 108, first input device 110, second input device 112, third input device 114, display 116, and the Internet 118.

Server 102 may be operable to facilitate the delivery of an interactive video, as described in relation to FIGS. 4 to 10. First, second, and third client devices 104, 106, and 108 may further be operable to facilitate the delivery of the interactive video, as described in relation to FIGS. 4 to 10.

Figure 2:
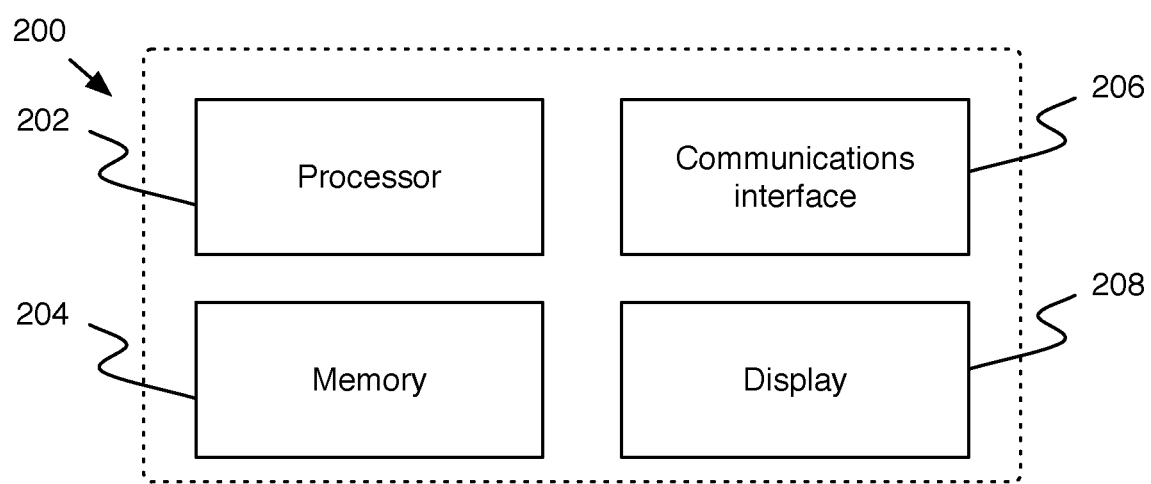
FIG. 2: depicts system 200, in accordance with an embodiment of the invention.

Each of server 102, first client device 104, second client device 106, and third client device 108, may include a processing device 200, as depicted in FIG. 2. Processing device 200 includes a processor 202, a memory 204, and a communication interface 206. In examples, processing device 200 may further include a display 208.

Processor 202 may be configured for executing computer instructions, which, when executed on the system 100, perform a portion or all of the methods described in relation to FIGS. 4 to 10. In embodiments, processor 202 may include a single, or any multiple number of processors, as will be understood by those of skill in the art.

Memory 204 may be an electronically readable medium or a computer readable medium configured to store computer program instructions. In examples, memory 204 may include a non-transitory medium.

Stored computer program instructions, when executed on the processor 202, may perform a portion or all of the methods described in relation to FIGS. 4 to 10.

In examples, processor 202 and memory 204 may be incorporated into a custom chipset, such as a system on a chip. For example, processor 202 and memory 204 may be incorporated into a custom Snapdragon, Tegra, Mali-400, Cortex, Samsung Exynos, Intel Atom, Apple, or Motorola chip, or any other type of chip known to those of skill in the art.

In examples, portions of the methods described in relation to FIGS. 4 to 10 may be stored or executed outside of system 100. For example, a portion of the methods described in relation to FIGS. 4 to 10 may be stored or executed on a combination of a server and cloud storage facility via Internet 118.

Communications interface 206 may be configured to communicate with devices external to server 102, first client device 104, second client device 106, or third client device 108. For example, communications interface 206 may communicate with any of first input device 110, second input device 112, third input device 114, or display 116.

In examples, communications interface 206 may be wired or wireless interfaces. Communications interface 206 may include a short-range or low-powered wireless standard such as Bluetooth, Bluetooth LE, zigbee, or near field communication (NFC). Communications interface 206 may further include WIFI, 3G, 4G, Ethernet, or any other communications known to those of skill in the art. In examples, processing device 200 may request, send, or receive information, save information, or send or receive messages from a remote device over Internet 118.

When the processing device 200 includes an integrated display 208, the display 208 may be operable to display one or more interactive videos in conjunction with the methods described in relation to FIGS. 4 to 10.

In examples, any of first client device 104, second client device 106, or third client device 108 may be a hand-held or mobile computing device such as a smart phone, a tablet, a smart watch, or a wearable device. In further examples, any of first client device 104, first client device 106, or second client device 108 may be a computing apparatus such as a smart TV, a video game console, a laptop, or desktop computer, or an app-enabled piece of household hardware.

In examples, first client device 104, second client device 106, or third client device 108 may receive inputs from one or more inputs from integrated input devices. In further examples, however, first client device 104, second client device 106, or third client device 108 may be connected to any combination external input devices, such as: first input device 110, second input device 112, or third input device 114, respectively.

First client device 104, second client device 106, third client device 108, first input device 110, second input device 112, or third input device 114 may include any combination of input devices operable to receive information from a human, an animal, or an environment. For example: first, second or third client device 104, 106, 108, or first, second, or third input device 110, 112, 114 may include: a touch screen, a mouse, a game controller, a gesture recognition device, a joystick, a pressure sensing device, an accelerometer, a gyroscope, or a GPS.

In further examples, first, second or third client device 104, 106, 108, or first, second, or third input device 110, 112, 114 may include one or more biomonitor devices, such as a heart rate monitor, an oximeter, or an electromyography monitor. Alternatively, first, second or third client device 104, 106, 108, or first, second, or third input device 110, 112, 114 may include any combination of environmental sensors, such one or more weather or motion sensors. First, second or third client device 104, 106, 108, or first, second, or third input device 110, 112, 114 may further include any other type of input device known of those of skill in the art.

FIG. 1 includes a server device 102. Server device 102 may be operable to execute instructions, or to retrieve and save data in a database. In examples, server device 102 may include a single server, or multiple servers in a distributed architecture. In examples, server device 102 may support a relational database, a NoSQL database, a distributed database, or any other database known to those of skill.

In examples, server 102 may communicate via Internet 118 to deliver interactive video to at least one of first client device 104 or third client device 108.

In further examples, however, first client device 104 may communicate with second client device 106 to deliver interactive video on at least one of first client device or second client device. In examples, second client device 106 may display video on external display 116.

Figure 3:
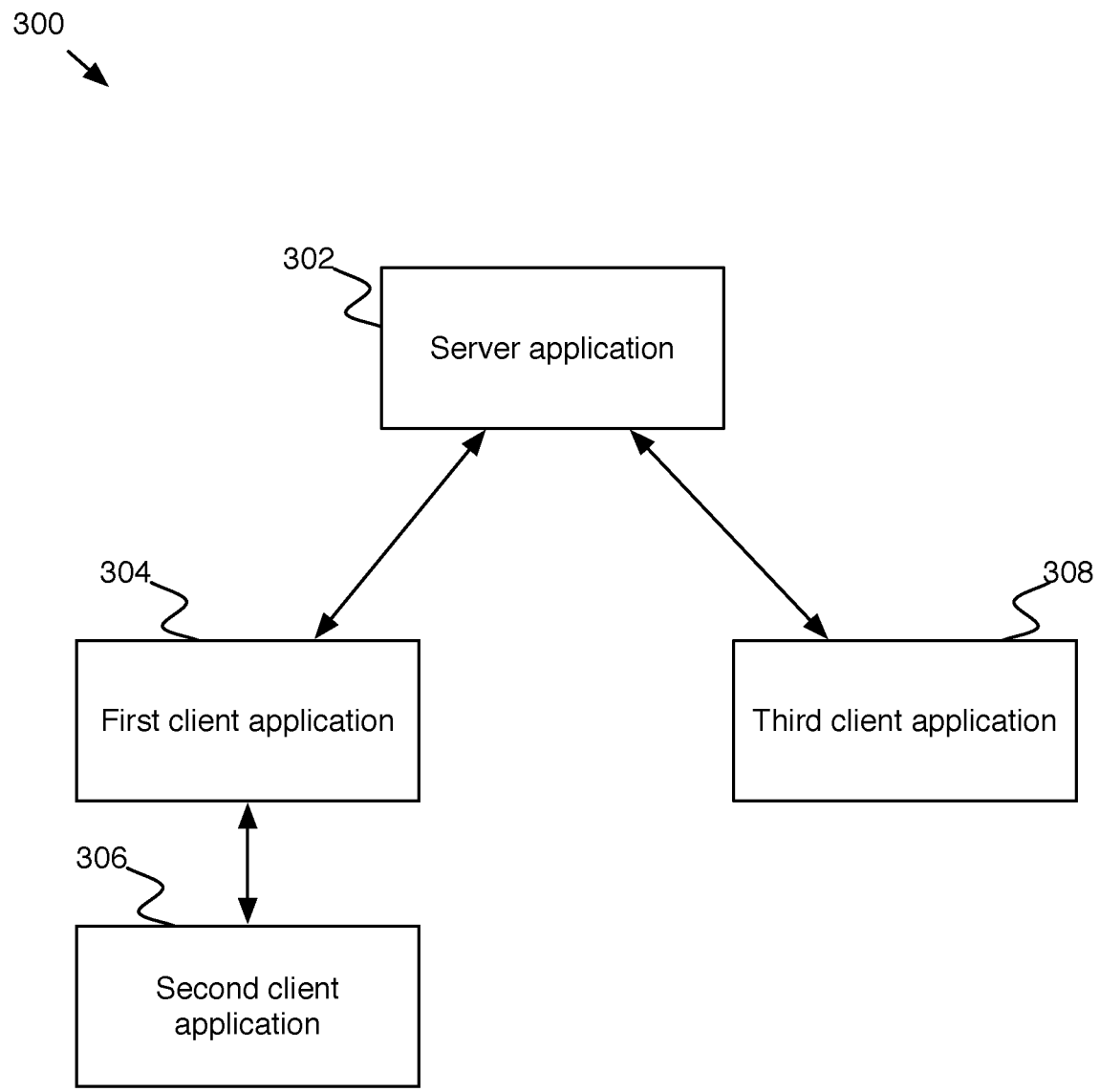
FIG. 3: depicts system 300, in accordance with an embodiment of the invention.

FIG. 3 depicts system 300, in accordance with an embodiment. System 300 may facilitate the delivery of an interactive video. System 300 includes first client application 304. System 300 may further include server application 302, second client application 306, and third client application 308.

Server application 302 may be configured to receive input from at least one of first client application 304, second client application 306, and third client application 308, and to deliver interactive video.

First client application 304, second client application 306, and third client application 308 may further be configured to receive input and deliver an interactive video.

First and third client applications 304, and 308 may each communicate with server application 302.

Second client application 306 may communicate with first client application 304. Second client application 306 may receive inputs from or transmit inputs to first client application 304. In examples, second client application 306 may display an interactive video after receiving inputs from first client application 304.

In examples, server application 302, first client application 304, second client application 306, and third client application 308 may each operate on separate devices. For example, server application 302 may operate on server device 102; first client application 304 may operate on first client device 104; second client application 306 may operate on second client device 106; and third client application 308 may operate on third client device 108.

In further examples, however, the functions of any one of server application 302, first client application 304, second client application 306, and third client application 308 may be distributed across additional computing devices. For example, server application 302 may operate across a group of distributed servers.

Figure 4:
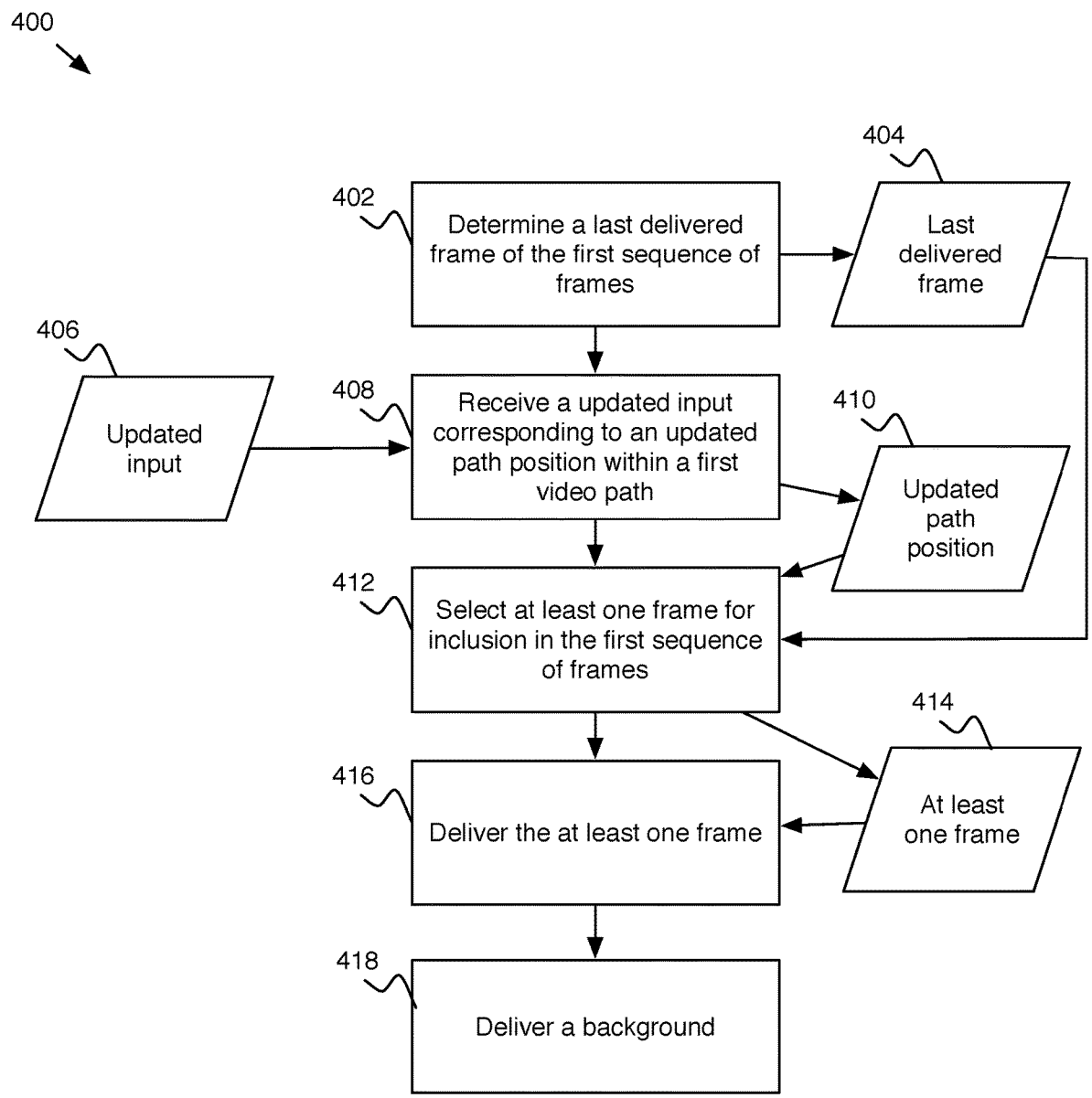
FIG. 4: depicts method 400, in accordance with an embodiment of the invention.

FIG. 4 depicts method 400, an example embodiment that may be executed by server application 302, first client application 304, second client application 306, or third client application 308. Method 400 may deliver an interactive video including a first sequence of frames based on a first video.

An interactive video is a video including one or more video clips that may be delivered in response to one or more user inputs. In examples, interactive video 500 depicts an object in motion. For example, the object may be translating or rotating across video display 502.

Figure 5:
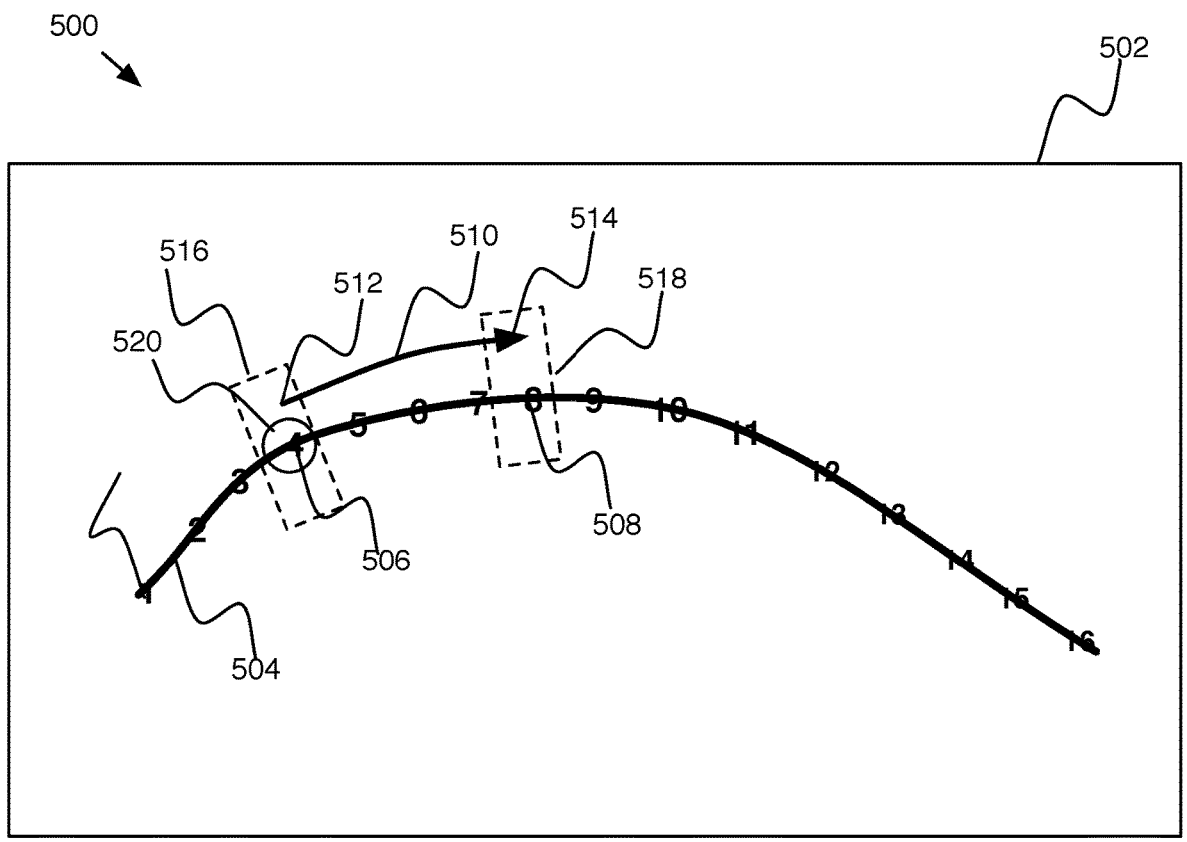
FIG. 5: depicts interactive video 500, in accordance with an embodiment of the invention.

For example, FIG. 5 depicts interactive video 500. Interactive video 500 delivers the first sequence of frames inside display area 502.

Figure 6:
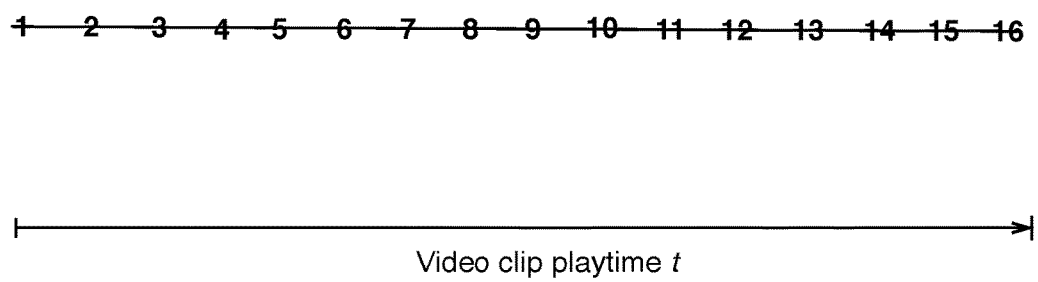
FIG. 6: depicts video clip 600, in accordance with an embodiment of the invention.

Interactive video 500 may deliver a first sequence of frames based on a first video. For example, FIG. 6 depicts example video clip 600. Each number 1 to 16 depicted along video clip 600 represents a numbered frame of the first video. Interactive video 500 may deliver the frames of first video 600 in different sequences depending on user inputs.

In examples, interactive video 500 may deliver sequences of frames based on first video 600 in a forwards or backwards direction. In examples, interactive video 500 may skip one or more frames included in video clip 600. In examples, interactive video 500 may interpolate between adjacent frames of video clip 600 to create additional frames.

Interactive video 500 includes a first video path 504. First video path 504 is a line or path in interactive video 500 along which a user may provide one or more inputs. Each position along first video path 504 corresponds to an x, y coordinate of display area 502.

In examples, a video path 504 may be a straight or curvilinear line, such as first video path 504 of FIG. 5. In further examples, however, the video path may take any shape, including but not limited to two dimensional shapes or branched shapes. A video path may trace an open path or a closed path on display area 502.

In examples, the first video path 504 may be stationary with regards to the display area 502 regardless of the frame being delivered by interactive video 500. In further examples, however, the first video path 504 may translate or change within the display area 502.

In examples, the individual frames of the first video 600 may correspond to different positions or orientations of an object in the first video. In examples, the different positions or orientations of an object in the first video may approximately follow the video path 504 coordinates.

Each path position along first video path 504 may correspond to a frame of video clip 600. This is depicted in FIG. 5, where the frame numbers 1 to 16 of the first video 600 are superimposed over video path 504.

A user may provide input along first video path 504, which may advance first video 600 frontwards or backwards to the frame corresponding with the path position selected by the user.

Method 400 begins with step 402. In step 402, a last delivered frame 404 of the first sequence of frames is determined. The last delivered frame 404 is the last frame delivered for display to the user from the first video.

In examples, the last delivered frame 404 may correspond to a previous path position. For example, FIG. 5 depicts previous path position 506. In examples, a previous path position may have been selected by the user, set by a default, or determined via any other method. For example, the last delivered frame may be frame 4, as indicated by previous path position 506 in FIG. 5.

Method 400 continues with step 408. In step 408, an updated input 406 is received corresponding to an updated path position 410 within the first video path.

The updated input 406 is an input received by a user. In examples, updated input 406 may be received using any input device described herein with regards to first client device 104, second client device 106, third client device 108, first input device 110, second input device 112, and third input device 114. For example, updated input 406 may be received via a touch screen on first client device 104.

In examples, the updated input 406 may be an x, y coordinate within video display 502. In examples, updated input 406 may be associated with the latest point of a path, or a swipe motion made by a user. For example, FIG. 5 depicts a swipe path 510 including a previous input 512 and an updated input 514. In the example of a touch screen, a user may have initially touched the screen at previous input 512, and moved continuously to updated input 406.

In examples, the user input may be sampled at different sample rates. In examples, the user input may be sampled twice during swipe path 510, once at previous input 512 and once at updated input 514. In further examples, however, the user input may be sampled more than two times. In both cases, interactive video 500 may deliver frames of first video 600 that respond in real time to the user's updated input.

In the example of FIG. 5, updated input 514 corresponds to an updated path position 508. In examples, swipe path 510 may overlap first video path 504 or may be proximate to first video path 504. In examples, updated path position 508 may represent the closest point of first video path 504 to the updated input 514.

Method 400 continues with step 412. In step 412, at least one frame 414 is selected for inclusion in the first sequence of frames based on the last delivered frame 404, and the updated path position 410.

In examples, the first video 600 may include a series of key frames, intra frames, or complete images stored in a video file. In further examples, the first video 600 may include both key frames and intermediate frames, stored in a video file. The intermediate frames may be delta frames that support a compressed video file.

In the example of FIG. 5, the at least one frame 414 may be selected by determining the distance advanced along first video path 504 between a previous path position 506 corresponding to last delivered frame 404, and the updated path position 508 corresponding to the updated input 514. For example, if the last delivered frame 404 is frame number 4, corresponding to previous path position 506, and the updated path position 410 corresponds to frame 8, then the at least one frame 414 may include one or more of frames 4, 5, 6, 7, or 8.

Method 400 continues with step 416. In step 416, the at least one frame 414 is delivered. Delivering at least one frame 414 may include transmitting the frame to another device. For example, server device 102 may transmit at least one frame 414 to first client device 104. In further examples, however, delivering may include displaying the at least one frame 414.

In examples, one or more video codecs may be used in step 416 to support converting intermediate frames to displayable frames based on key frames. In examples, the one or more video codecs may support converting intermediate images when selecting one at least one frame 414 of first video 600 in a frontwards video direction, a backwards video direction, or a combination thereof.

In examples, the first video may include live action video. Live action video includes video filmed with a camera using real actors and/or objects. In examples, live action video may include no computer-generated graphics or the live action video may include some previously integrated computer-generated graphics.

In examples, the first sequence of frames may include a sub-sequence of frames from the first video. In examples, sub-sequence may include one or more continuous frames from first video 600 For example, the first sequence of frames may include frames 4, 5, 6, 7, and 8 of first video 600, as described above.

In examples, the updated input may be within an engageable region of the first video path. An engageable region is an area of video display 502 where a user may provide inputs to interact with interactive video 500. In examples, the engageable region may cover a subsection of the first video path 504 and some area around it. For example, FIG. 5 depicts engageable regions 516 and 518 that are shaped as rectangles, oriented perpendicular to the intersecting portions of first video path 504.

In examples, the engageable region may depend on the video path position. For example, previous path position 506 may correspond to engageable region 516, and updated path position 514 may correspond to engageable region 518.

By providing an engageable region within which updated input must be received, it may be possible to constrain the inputs received from the user to a region of video display 502 corresponding to an object of interest. If the object of interest is a drawer that opens and closes along the video path 504, for example, then the engageable region may constrain the interactive video 500 to only deliver new frames in response to the user's actions when the user engages the area of video display 502 near to the drawer.

In examples, the updated input may be further received within an engageable time period after a previous input. In examples, the engageable time period may be a predetermined time period. In further examples, the engageable time period may be dependent on other inputs provided by the user. The engageable time period may cause the user to complete inputs to an interactive video within a discrete time period, thereby prompting the user to react quickly to activities unfolding in the interactive video. This may help to further deepening user engagement.

In examples, delivering the at least one frame may include delivering an engageable region clue. Engageable region clue may include any visible shape, icon, picture, or overlay recognizable to a user known to those of skill in the art. For example, interactive video 500 includes engageable region clue 520. Engageable region clue 520 is a circle that may appear at any time to inform a user that an object depicted in interactive video 500 may be interacted with.

In examples, the updated input may be received via a touch screen, a mouse, a pressure sensing device, an accelerometer, a gyroscope, a gesture recognition device, a joystick, or a game controller. This is not intended to be limiting, however, in further examples, updated input may be received via any input known to those of skill in the art.

In examples, the last delivered frame of the first sequence of frames may correspond to a previous path position, and selecting the at least one additional frame may be further based on a path distance between the previous path position and the updated path position.

In examples, the updated first input may include a first updated coordinate and a second updated coordinate. The updated path position may further include a first updated path position corresponding to the first updated coordinate and a second updated path position corresponding to the second updated coordinate. The at least one frame may be further based on a path difference between the first updated path position and the second updated path position.

Figure 7:
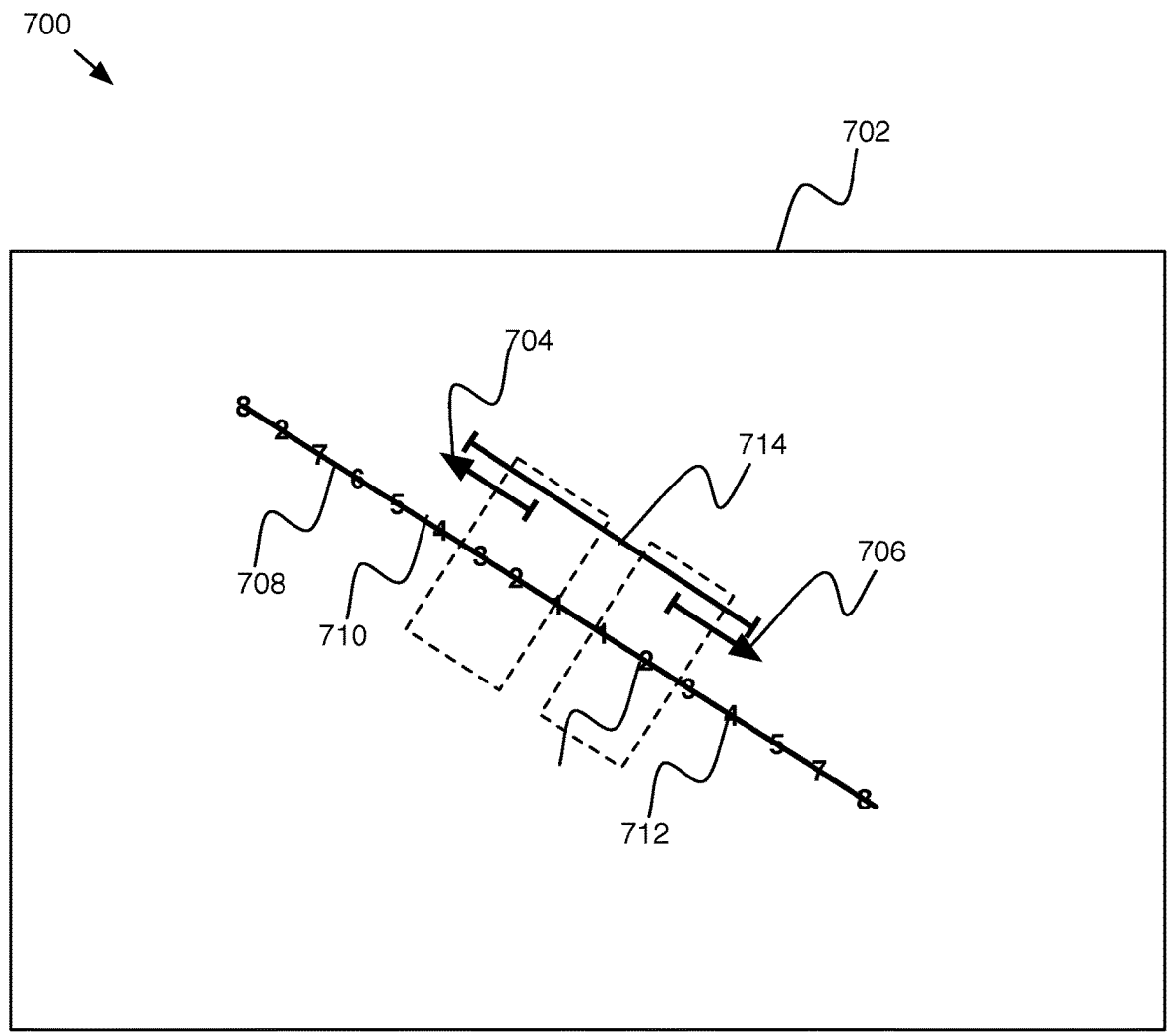
FIG. 7: depicts interactive video 700, in accordance with an embodiment of the invention.

For example, FIG. 7 depicts interactive video 700. Interactive video 700 may be engaged via an input that includes a pinching input motion requiring two contact points. Interactive video 700 includes first updated coordinate 704 and second updated coordinate 706. First and second updated coordinates 704 and 706 are the positions on video display 702 where a user may conclude a pinch gesture, moving two points together or apart, to designate an updated input.

In the example of interactive video 700, a frame may correspond to more than one path position. As may be seen in FIG. 7, each frame of first video 600 corresponds to two positions along video path 708. For example, first updated path position 710 corresponds to first updated coordinate 704, and second updated path position 712 corresponds to second updated coordinate 706.

The at least one frame selected in interactive video 700 may be further based on a path difference between the first updated path position and the second updated path position. FIG. 7 depicts the path difference 714.

By providing a pinch gesture using two inputs points, this may provide a way for a user to interact with an object in an interactive video that opens and closes. For example, this may allow an interactive video to simulate allowing a user to open or close a butterfly's wings or an origami crane.

Figure 8A:
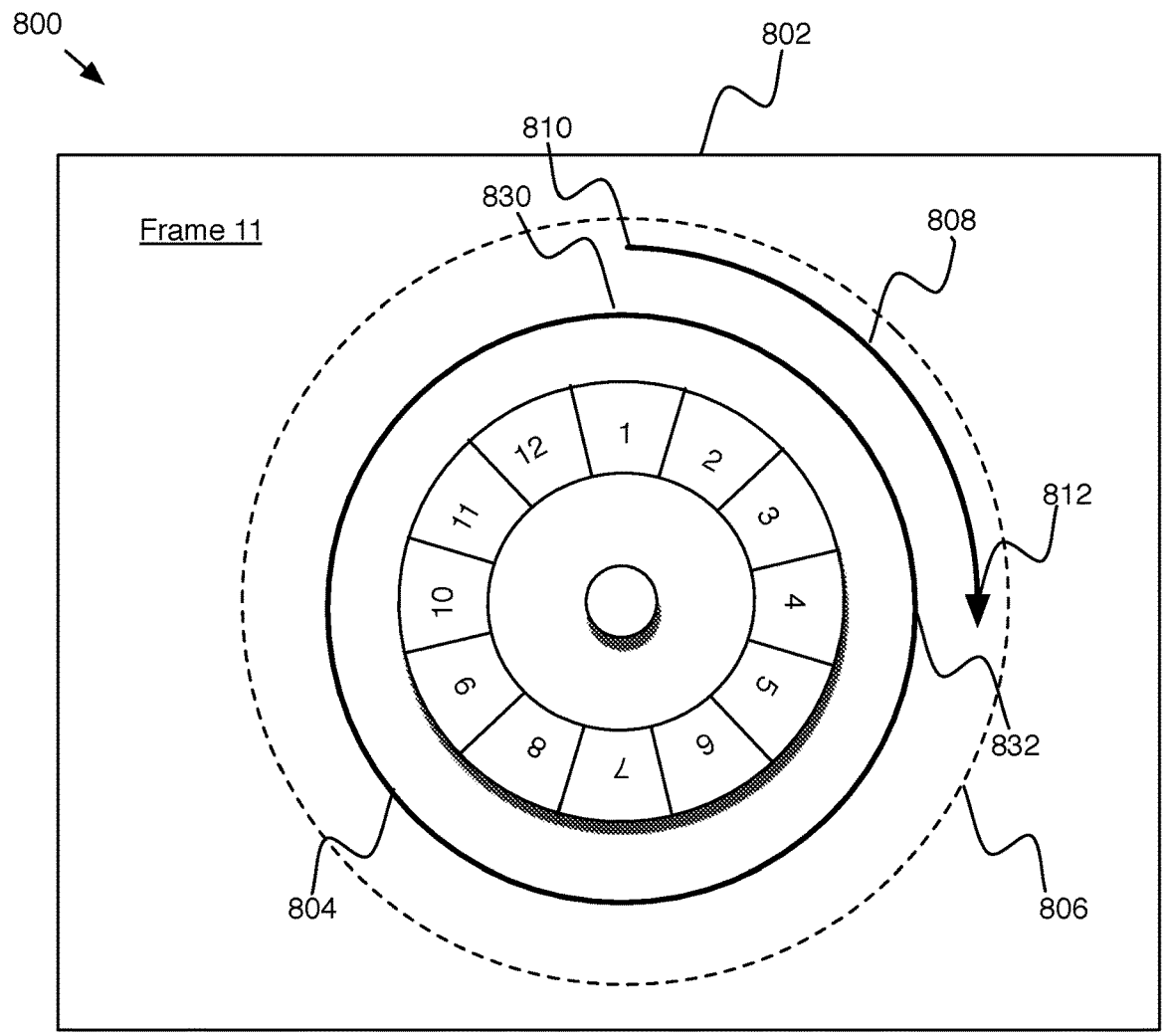
FIG. 8A: depicts interactive video 800, in accordance with an embodiment of the invention.
Figure 8B:
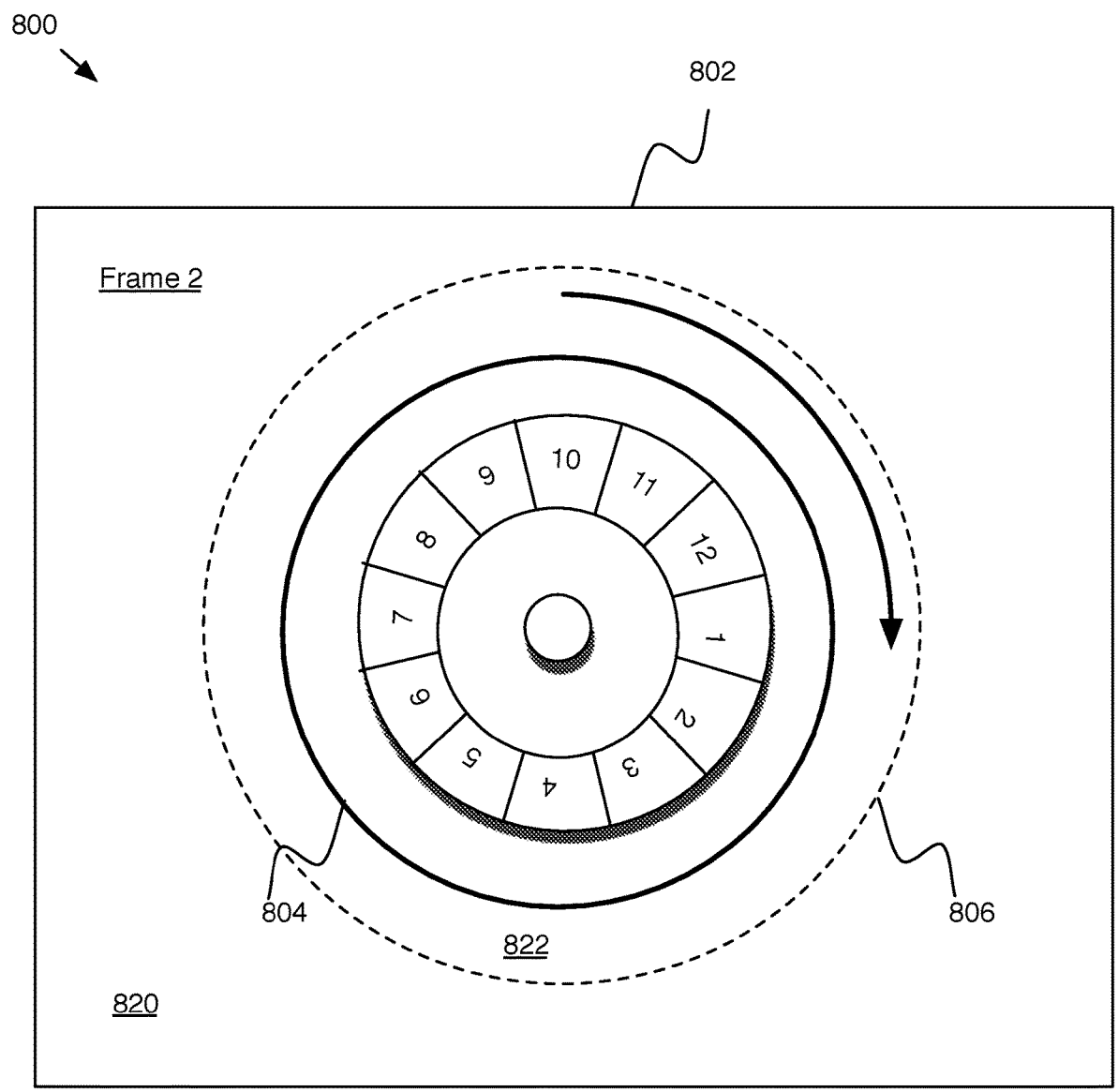
FIG. 8B: depicts interactive video 800, in accordance with an embodiment of the invention.

FIGS. 8A and 8B depict interactive video 800. Interactive video 800 delivers frames depicting a rotating safe dial.

It may be seen in interactive video 800 that initiation region 806 incorporates the entire dial object. Initiation region 806 may further include some of the peripheral area around the dial object. A user may engage anywhere on the dial. For example, FIG. 8A depicts interactive video 800 at a first rotation, and FIG. 8B depicts interactive video 800 at a second rotation.

Interactive video 800 includes a video clip path 804. Video clip path 804 is a closed, circular path. This is not intended to be limiting, however, as those of skill will understand that video clip path 804 may be any shape.

A user may swipe along video clip path 804 in either rotational direction continuously without interruption. In examples, the first and last frames of first video may be delivered by interactive video 800 sequentially in either direction, effectively looping first video as the user rotates the simulated dial.

In examples, selecting the at least one frame for inclusion in the first sequence of frames may be further based on a previous path position.

For example, in FIG. 8A, it may be seen that a user has traced a swipe path 808. Swipe path 808 begins with previous input 810 corresponding to previous path position 830, and ends with updated input 812 corresponding to updated path position 832. Swipe path 808 traces an arc.

Selecting the at least one frame for inclusion in the sequence of frames for interactive video 800 may include determining how many frames to advance based on the previous path position 830 and updated path position 832. Once the number of frames to be advanced and the direction to play first video 600 are determined, interactive video 800 may include the correct number of frames from the first video in the first sequence of frames after the last delivered frame.

For example, FIG. 8A may depict frame 11 of first video, which includes frames 1 to 12. A user may swipe along swipe path 808, tracing an arc that covers a quarter of video path 804. Interactive video 800 may therefore deliver frames from first video that represent moving the dial through a quarter of its rotation, providing the view of interactive video 800 depicted in FIG. 8B.

In examples, the last delivered frame and the at least one frame may include a begin frame and an end frame of the first video. For example, the begin frame and end frames in the example of first video 600 are 1 and 12, respectively. This may allow the first video to seamlessly loop, providing a natural, intuitive user experience.

Figure 9:
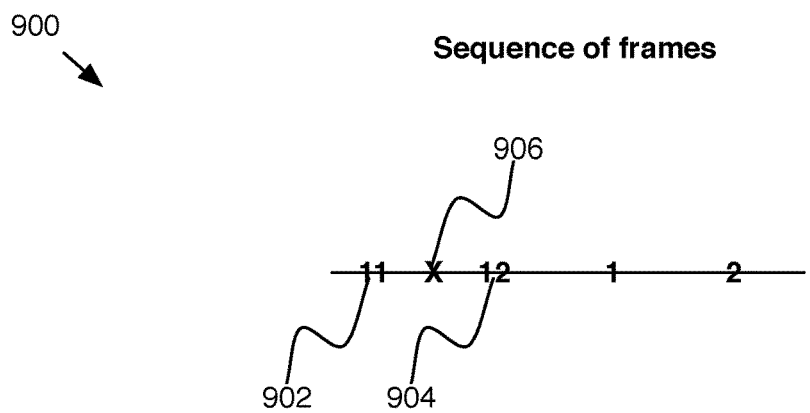
FIG. 9: depicts sequence of frames 900, in accordance with an embodiment of the invention.

FIG. 9 depicts sequence of frames 900. Sequence of frames may be delivered in interactive video 800 upon receiving the inputs indicated in FIG. 8A. Sequence of frames 900 begins with frame 11, the last delivered frame. Sequence of frames 900 continues with frame 12, an end frame, frame 1, a begin frame, and frame 2, delivering 25% of the frames from the first video. In this way, interactive display 800 may loop. This may provide the user the experience of continuously rotating an object.

Figure 10A:
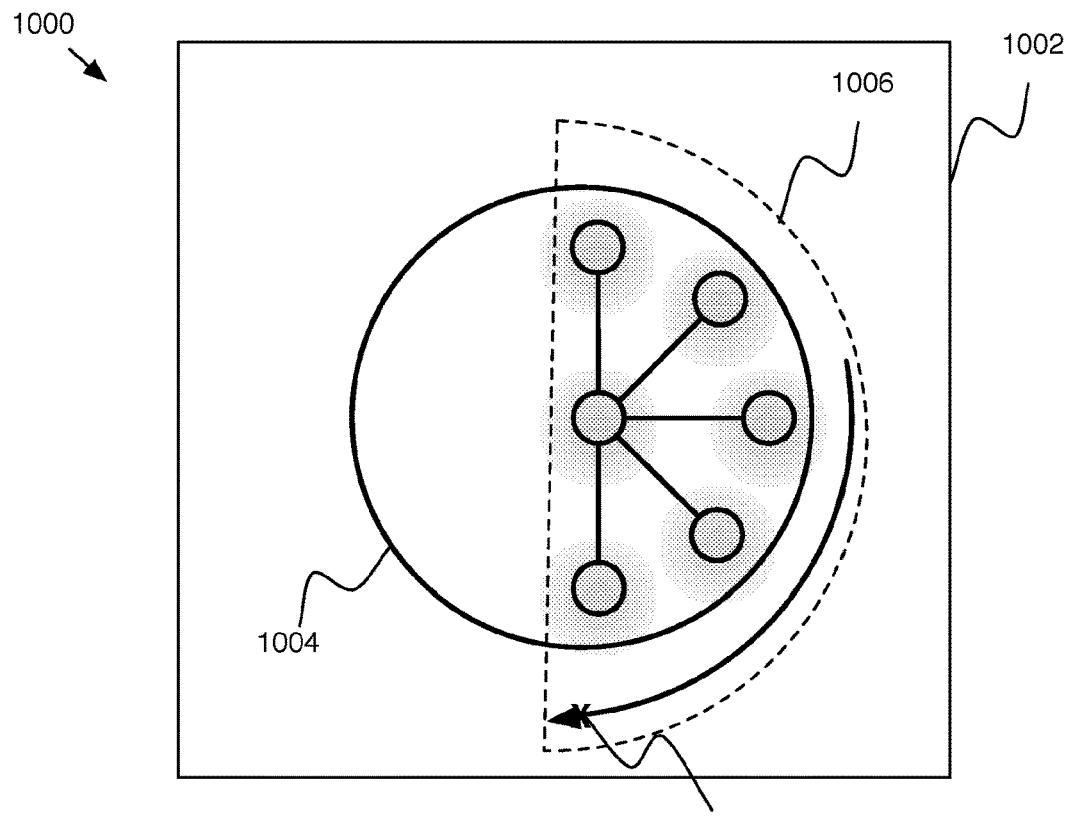
FIG. 10A: depicts interactive video 1000, in accordance with an embodiment of the invention.
Figure 10B:
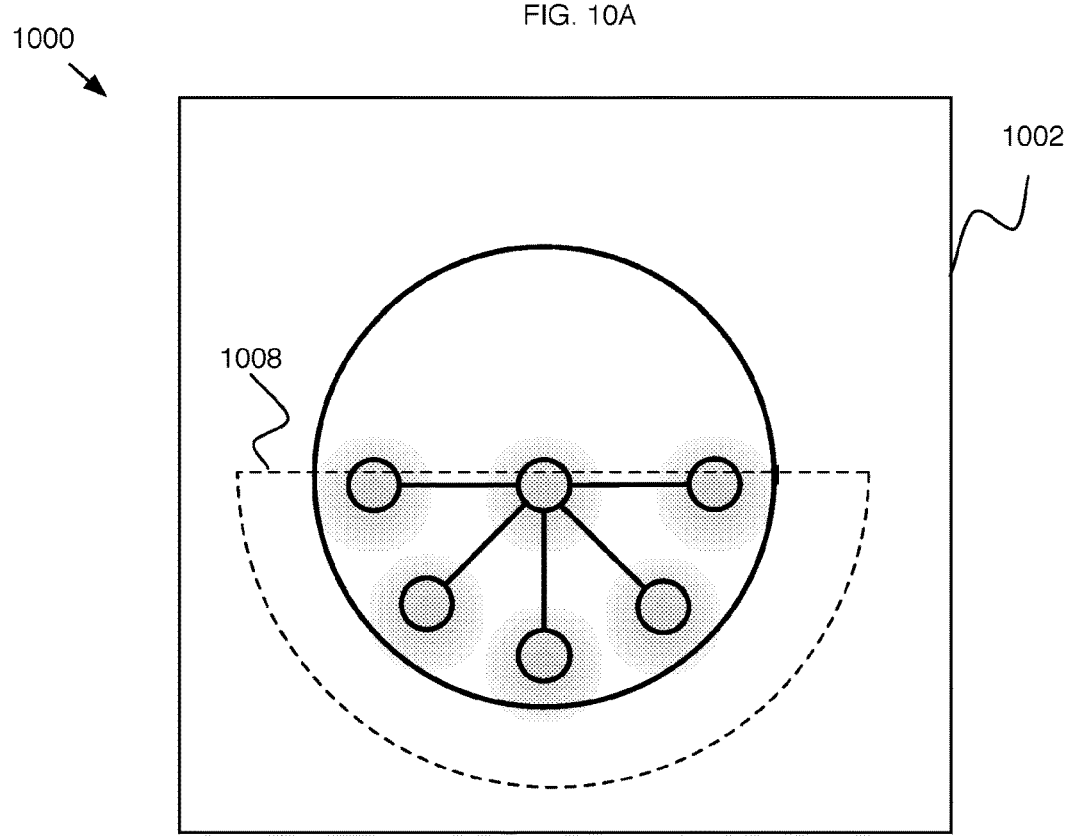
FIG. 10B: depicts interactive video 1000, in accordance with an embodiment of the invention.

FIGS. 10A and 10B depict interactive video 1000. Interactive video 1000 depicts a movable safe handle. Like the dial of interactive video 800, interactive video 1000 has a circular video path 1004. However, the example movable safe handle of FIGS. 10A and 10B covers a half-circle region that is not symmetrical about the axis like a safe dial.

The engageable region of interactive video 1000 may be based on the last delivered frame. For example, engageable region 1006 surrounds the semi-circle safe handle in FIG. 10A in a semi-circle shape, as noted by the dotted lines. After user input to rotate the safe handle a quarter turn is received however, as depicted in FIG. 10B, the safe handle no longer lines up with the previous engageable region 1006. As may be seen in FIG. 10B, the engageable region rotates as with the safe handle to become engageable region 1008. By basing the engageable region on the last delivered frame, it is possible to further constrain the user to engageable areas of interactive video. This may provide a more realistic interaction for the user.

Figure 11A:
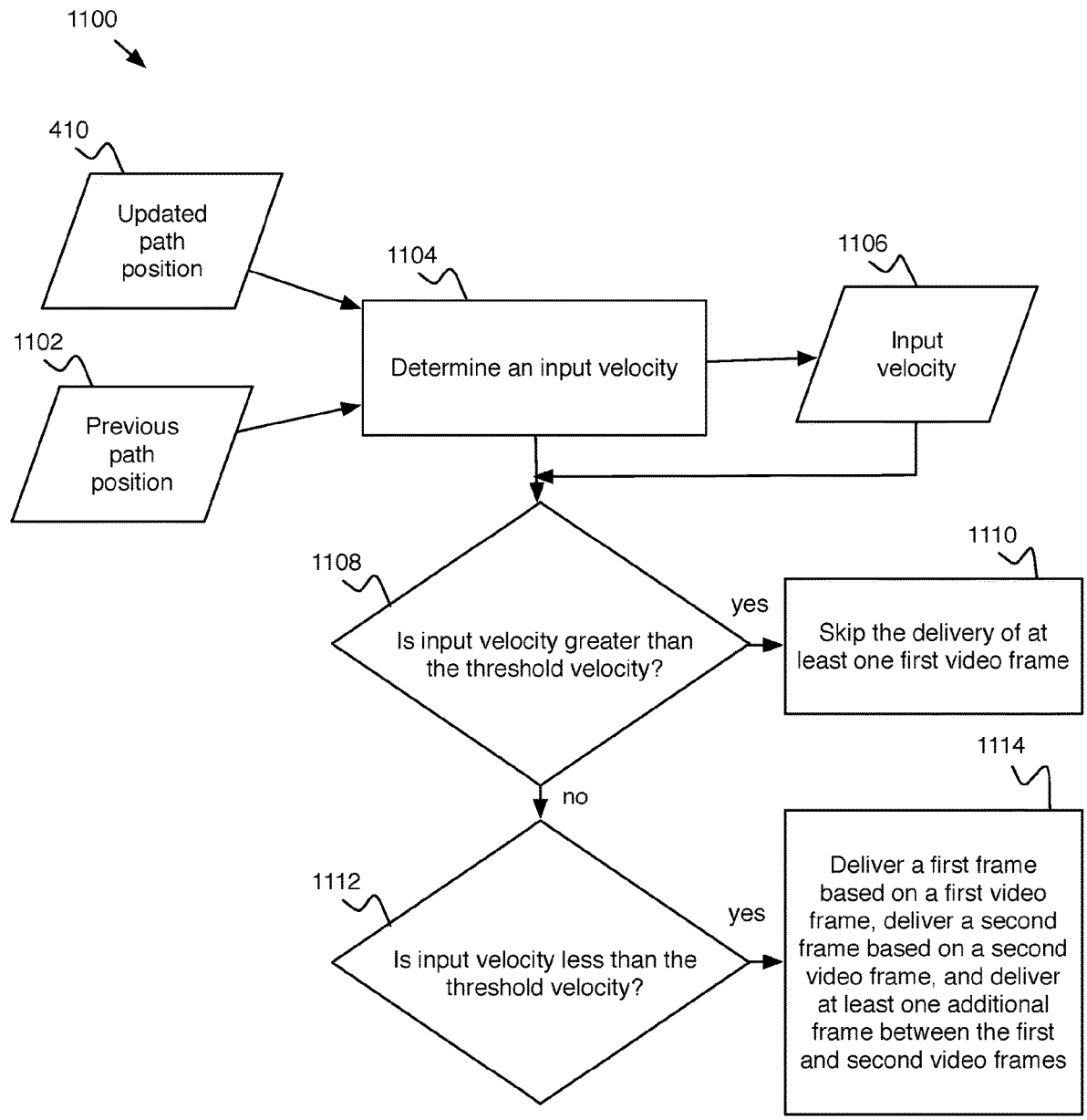
FIG. 11A: depicts method 1100, in accordance with an embodiment of the invention.
Figure 11B:
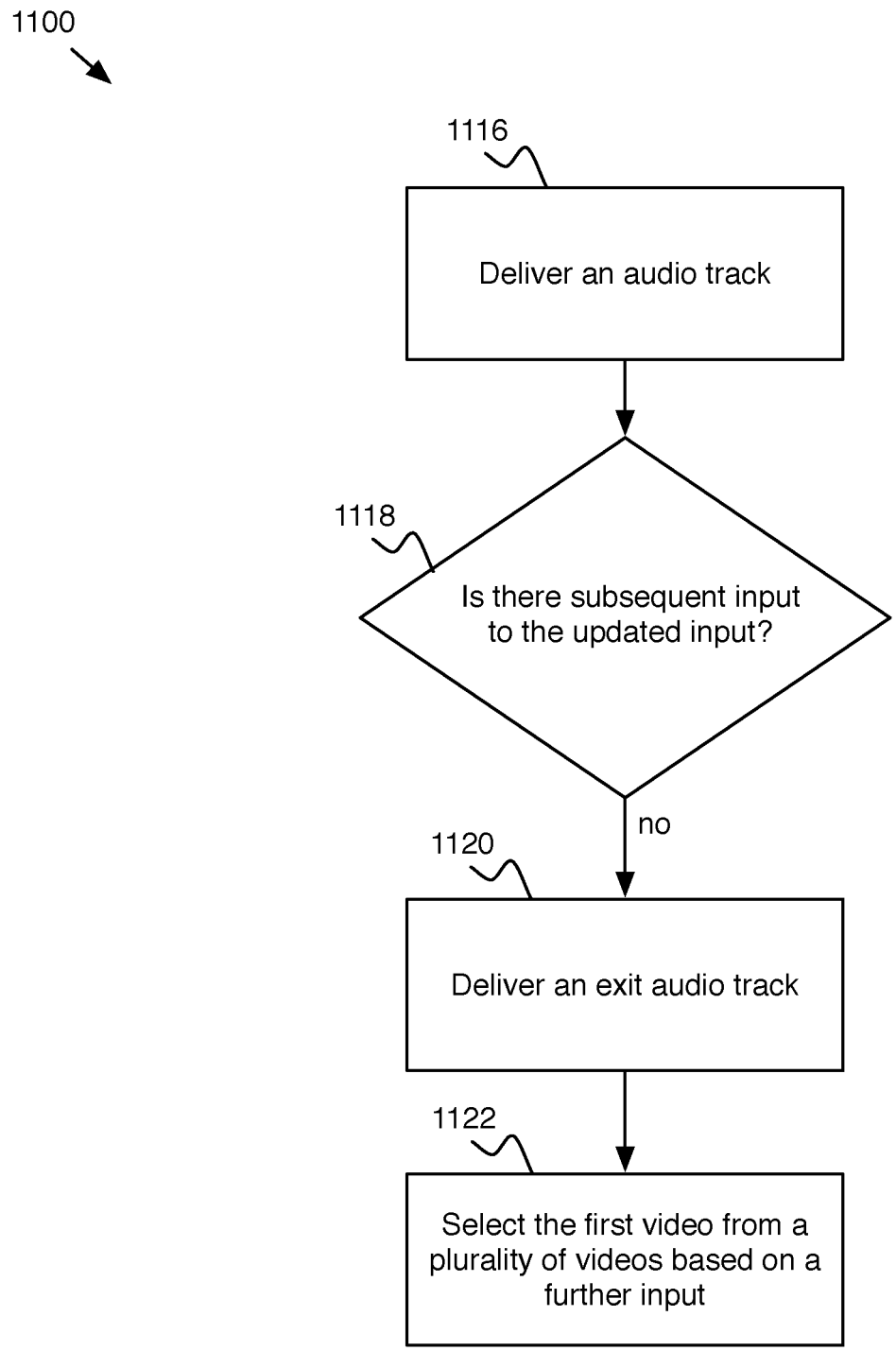
FIG. 11B: depicts method 1100, in accordance with an embodiment of the invention.
Figure 11C:
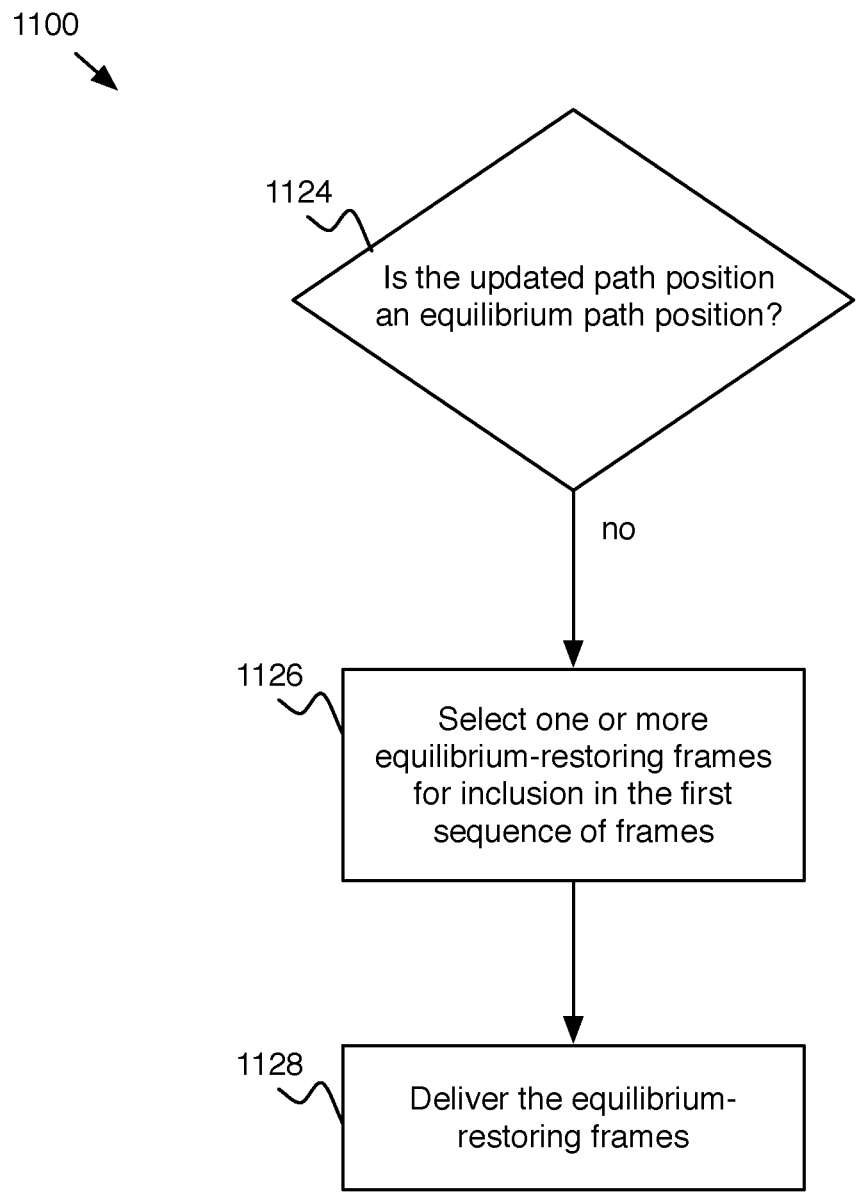
FIG. 11C: depicts method 1100, in accordance with an embodiment of the invention.

In examples, method 400 may further include one or more steps of method 1100 of FIGS. 11A, 11B, and 11C.

In examples, an interactive video may match an input speed. For example, method 400 may include steps 1104 and 1108 of method 1100. In step 1104, an input velocity 1106 may be determined. The input velocity 1106 is determined based on the updated path position 410, the previous path position 1102, and an input interval.

In examples, selecting the at least one frame in step 414 may be further based on the input velocity 1106. This may allow an interactive video, for example interactive videos 500, 700, 800, and 1000 to appear to be more responsive to the user. For example, if an interactive video may deliver images of a drawer opening and closing along a video path when a user engages a touch pad, the drawer may appear to match the user's input velocity on the touchpad. This may cause the drawer to appear to closely follow the user's finger.

In examples, method 1100 may continue with step 1108. In step 1108, it may be determined whether the input velocity is greater than a threshold velocity. In examples, the threshold velocity may be a velocity at which an image of an object in the first video 600, when played at a default playback rate, may lag behind the user's inputs. If the input velocity is greater than the threshold velocity, then method 1100 may continue to step 1110.

In step 1110, the delivery of at least one first video frame may be skipped. For example, only frames 11 and 2 may be delivered instead of frames 11, 12, 1, and 2. This may provide the appearance of a responsive video that keeps up with user inputs.

In examples, method 1100 may continue with step 1112. In step 1112, it is determined whether the input velocity is less than the threshold velocity. If the input velocity is less than the perceived video object velocity, then method 1100 may continue with step 1114.

In step 1114, a first frame is delivered based on a first video frame, a second frame is delivered based on a second video frame, the second video frame adjacent to the first video frame in the first video. At least one additional frame is delivered between the first video frame and the second video frame. The at least one additional frame is not a frame that was included in first video 600.

For example, in sequence of frames 900, first frame 902 and second frame 904 are delivered, with at least one additional frame 906 delivered in between.

In examples, the at least one additional frame may be an interpolated frame based on at least one of the first frame or the second frame. In examples, the at least one additional frame may utilize motion interpolated frame or any other type of interpolation known to those of skill in the art.

In examples, the at least one interpolated frame may include a fading effect. For example, at least one additional frame 906 may include a combination of faded first frame 902 and second frame 904.

In examples, the degree of fading applied in the fading effect may be based on the input velocity and the threshold velocity. For example, if at least one additional frame 906 includes three frames because the input velocity is relatively slow, each of those three frames may include a different degree of fading for first and second frame 902 and 904. This may provide the appearance of a gradual translation or rotation of an object of interest in response to a slow input velocity.

In examples, method 1100 may include step 1116. In step 1116, an audio track may be delivered, wherein at least one of a pitch or a volume of the audio track is determined by the input velocity.

In examples, the audio track may include sound recorded with a live-action video. In further examples, the audio track may include simulated or synthesized sounds. By varying at least one of the pitch or volume according to input velocity, it may be possible to further simulate real movement in the interactive video.

In examples, method 1100 may include steps 1118 and 1120. In step 1118, it may be determined that there is no subsequent input.

Eventually the user input will end, however, for example when the user takes a finger off the touch pad, at which point there will be no subsequent input at the next input device sample period.

If it is determined in step 1118 that there is no subsequent input, then method 1100 may continue with step 1120. In step 1120, an exit audio track may be delivered. For example, the exit audio track may include a sound that signals that movement is halting in the interactive video.

In examples, method 1100 may include step 1122. In step 1122, the first video may be selected from a plurality of videos based on a further input.

In examples, the further input may be provided by the user using any of the input devices discussed with regards to first, second, or third user devices 104, 106, or 108, or first, second, or third input devices 110, 112, or 114. In further examples, however, the further input may include a game score, a parameter from a user profile, an account balance, or any other variable that can be received by an interactive video, as will be understood by those of skill in the art.

For example, the interactive video may depict a chest of drawers that a user can open and close. The plurality of videos may include different objects positioned in different drawers. Based on a prior user selection, the first video may be selected to deliver images of a specific object in the drawer.

In examples, method 1100 may include steps 1124, 1126, and 1128. In 1124, it may be determined whether the updated path position is an equilibrium path position. An equilibrium path position is a position where an object depicted in an interactive video may come to rest after being perturbed.

Figure 12A:
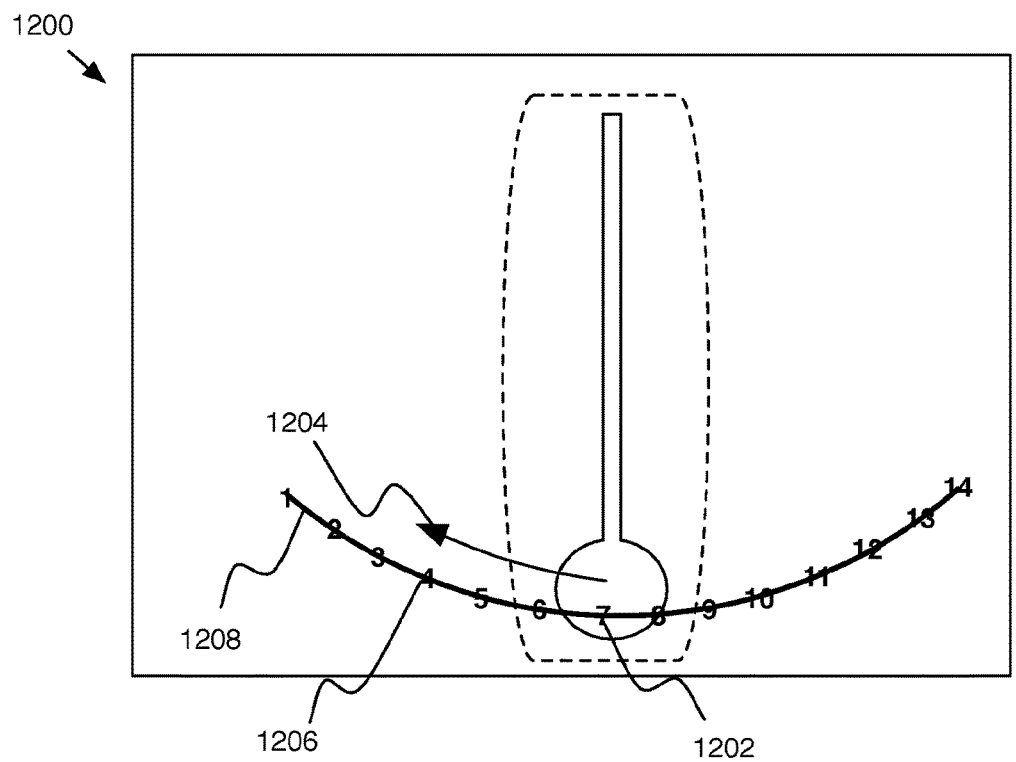
FIG. 12A: depicts interactive video 1200, in accordance with an embodiment of the invention.
Figure 12B:
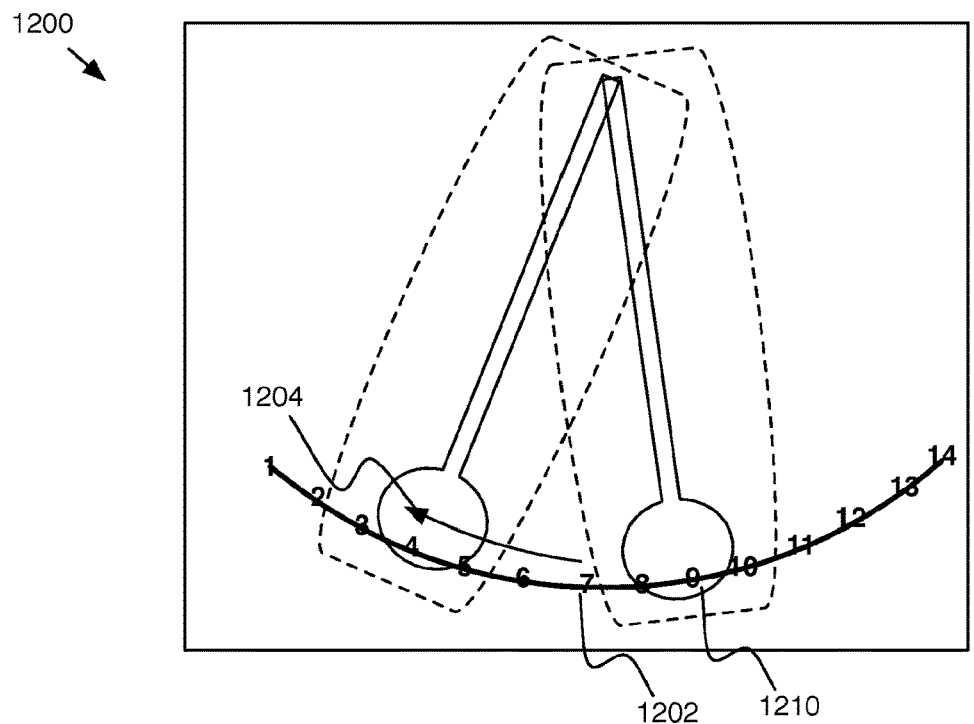
FIG. 12B: depicts interactive video 1200, in accordance with an embodiment of the invention.

For example, FIGS. 12A and 12B depict interactive video 1200. Interactive video 1200 delivers frames depicting a pendulum that, under the influence of gravity, oscillates after being displaced, coming to rest at equilibrium position 1202.

In the example of FIG. 12A, it may be seen that an updated input 1204 has been received. Updated input 1204 corresponds to updated path position 1206, which is not the equilibrium path position.

The updated path position is not an equilibrium path position in step 1124, method 1100 may continue with step 1126. In step 1126, one or more equilibrium-restoring frames may be selected for inclusion in the first sequence of frames based on the updated path position and the equilibrium path position.

In examples, the one or more equilibrium-restoring frames may include those frames of first video that restore the equilibrium position.

In examples, the one or more equilibrium-restoring frames may include the first video frames that correlate to the updated path position and the equilibrium path position. For example, video path 1208 may be seen in FIG. 12. The frames of first video that correspond to each path position are represented by numbers on video path 1208. Because updated path position 1206 corresponds to frame 4, and equilibrium path position corresponds to frame 7, the one or more equilibrium-restoring frames included in the first sequence may include any of frames 4 to 7.

Method 1100 may continue with step 1128, where the equilibrium-restoring frames are delivered.

Figure 13:
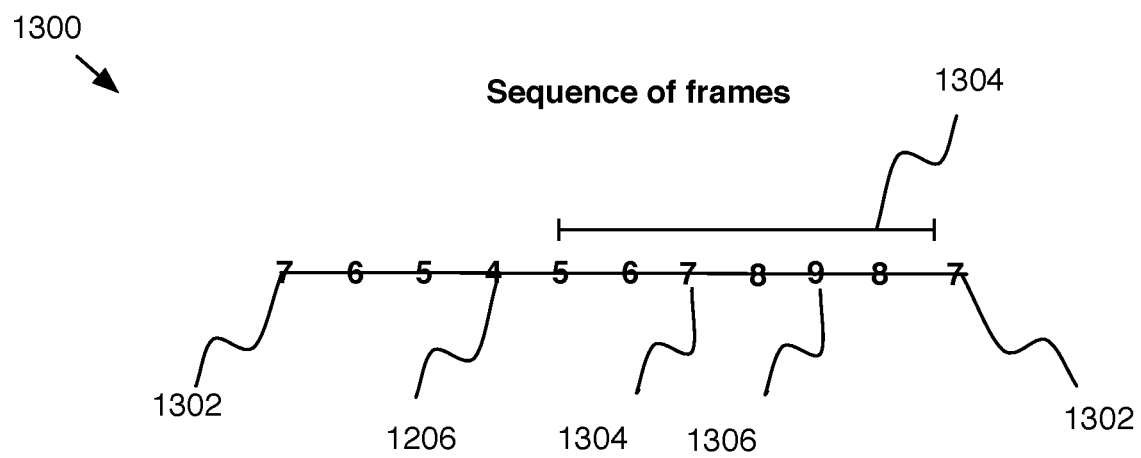
FIG. 13: depicts sequence of frames 1300, in accordance with an embodiment of the invention.
Figure 14:
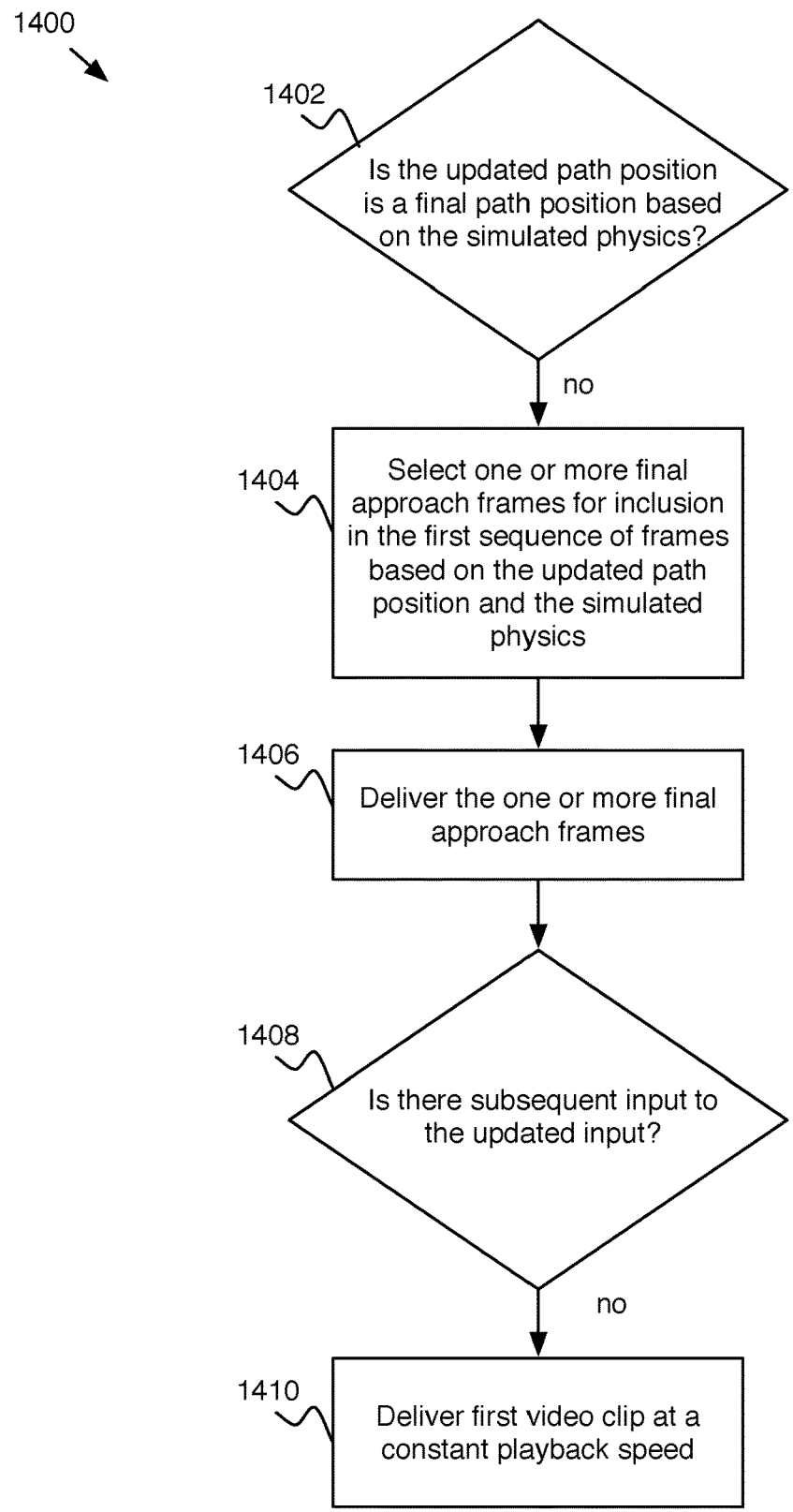
FIG. 14: depicts method 1400, in accordance with an embodiment of the invention.

In examples, a final frame of the one or more equilibrium-restoring frames may correspond to the equilibrium path position. For example, FIG. 13 depicts sequence of frames 1300. In sequence of frames 1300, it may be seen that the final frame is frame 7, which corresponds to the equilibrium path position 1202.

In examples, a first intermediate frame of the equilibrium-restoring frames may correspond to the equilibrium path position and a second intermediate frame of the equilibrium-restoring frames corresponds to an overshot path position opposite the equilibrium path position from the updated path position.

In FIG. 12B, it may be seen that upon receiving an updated input that corresponds to updated path position 1204, interactive video 1200 delivers frames 6, 5, and 4 that appear to move the pendulum towards updated input and updated path position 1204.

Interactive video 1200 may deliver the equilibrium-restoring frames next. For example, sequence of frames 1300 depicts equilibrium-restoring frames 1304. Equilibrium-restoring frames 1304 include first intermediate frame 1306, frame 7 corresponding to the equilibrium path position, and second intermediate frame 1308, frame 9 corresponding to overshoot position 1210, as depicted in FIG. 12B. Sequence of frames 1300 ends with frame 7, the equilibrium path position 1202.

In examples the equilibrium-restoring frames may include additional frames. In examples, the equilibrium-restoring frames may include additional equilibrium frames and overshoot frames to represent a longer oscillation phase.

In examples, selecting the at least one frame for inclusion in the first sequence of frames in step 412 is further based on a simulated physics in the first video path.

Simulated physics in an interactive video replicate the physics experienced by objects in the real world. In examples, the simulated physics in the first video path may include at least one of: a dampening effect, a spring effect, a gravity force, or an electromagnetic force.

A dampening effect may include any simulated frictional or a resistive force. For example, the damping effect may simulate friction causing a rolling cart to quickly halt after a user input is complete.

A spring effect may include any simulated restoring force. For example, a spring effect may simulate an object landing on a trampoline.

These examples are not intended to be limiting, other simulated physics are possible, as will be understood by those of skill in the art.

In examples, selecting at least one frame for inclusion in the first sequence of frames in step 412 may be based on the last delivered frame, and the steps of method 400 may further include any of the steps of method 1400. Method 1400 begins with step 1402. In step 1402, it may be determined whether the updated path position is a final path position based on the simulated physics.

For example, if the interactive video includes frames depicting a cart rolling, and the simulated physics include a high friction effect, then the final path position based on the simulated physics may be short of the updated path position. If, however, the interactive video includes frames depicting a cart rolling, and the simulated physics include a low friction effect, then the final path position may be beyond the updated path position.

Method 1400 may continue with step 1404. In step 1404, one or more final approach frames may be selected for inclusion in the first sequence of frames based on the updated path position and the simulated physics. The one or more final approach frames may include any frames between the last delivered frame and the frame corresponding to the final path position.

Method 1400 may continue with step 1406. In step 1406, the one or more final approach frames may be delivered.

In examples, a first intermediate frame of the one or more final approach frames may correspond to the updated path position, and a second intermediate frame of the final approach frames may correspond to an overshot path position opposite the updated path position from the previous path position.

For example, if the interactive video includes frames depicting a cart rolling, and the simulated physics include a low friction effect, then the one or more final approach frames may include the frames between the last delivered frame and the updated path position, and one or more frames beyond the updated path position to simulate that the cart has slowly come to a halt after the updated path position.

In examples, the one or more final approach frames may not include a frame corresponding to the updated path position.

For example, if the interactive video includes frames depicting a cart rolling, and the simulated physics include a high friction effect, then the one or more final approach frames may not include all of the frames between the last delivered frame and the updated path position to simulate that the cart has slowly come to a halt before the updated path position.

In examples, the one or more final approach frames may include a frame corresponding to an equilibrium path position. For example, sequence of frames 1300 depicts a pendulum swinging past the equilibrium position, frame 7, once before coming to rest at the equilibrium position.

In examples, method 1400 may further include step 1408. In step 1408, it may be determined whether there is subsequent input to the updated input. If there is no subsequent input, method 1400 may continue with step 1410.

In step 1410, the first video may be delivered at a constant playback speed. By delivering the first video after a user input ceases at a constant playback speed, it may be possible to simulate an object that stays in motion until interacted when there are no user interactions. For example, a windmill may continue to spin without user inputs.

In examples, method 400 may further include step 418. In step 418, a background may be delivered in a background area of a video display and the first sequence of frames may be delivered in an interactive video area of the video display.

A background may include any image or series of frames provided inside a video display are not a part of the first sequence of frames in the first area.

For example, FIG. 8B depicts interactive video 800. Interactive video 800 includes a background area 820 and an interactive video area 822. In examples, the video in the interactive area may have been filmed before a green screen to facilitate removing the background so that the interactive video can be paired with a different background in step 418.

In examples, delivering the background may include delivering a background video. The background video may include any video subject matter. In examples, background video may play in a loop.

In examples, the interactive video area may move relative to the video display. For example, the interactive video area may translate, rotate, or zoom in or out. The movement of the interactive video area may make an object depicted in the interactive video area to appear to move.

In examples, the background area may move relative to the video display. For example, the background area may also translate, rotate, or zoom in or out. The movement of the background area may help create a parallax effect in the interactive video.

In examples, the interactive video may further include delivering a second sequence of frames based on a second video in a second area. This may allow the interactive video to feature two interactive areas for a user to engage.

By delivering an interactive live action video that depicts movement coinciding with a user input along a video path, it may be possible to create high-quality, realistic interactive content without relying on computer-generated graphics. It may therefore be possible to bring a wealth of interactive videos to less advanced devices than those required for existing products.

In examples, delivering the at least one frame may include displaying the at least one frame on a display.

In examples, delivering the first video may include displaying the first video and delivering the second video clip may include displaying the second video clip. For example, the first video and the second video clip may be displayed using the displays associated with first client device 104, second client device 106, third client device 108, display 116, or display 208.

Alternatively, the first video and the second may be displayed on an external display connected to a client device, such as display 116. For example, FIG. 15 depicts sequence diagram 1500. As may be seen in sequence diagram 1500, first client application 304 may send first message 1502 to second client application 306. Second client application 306 may respond by sending second message 1504 to display 116 in turn.

In examples, first message 1502 may include input received at first client application 304. In further examples, first message 1502 may include video clips or frames from video clips.

In examples, second message 1504 may include instructions to display one or more video clips or frames. In further examples, second message 1504 may include actual video clips or frames to be displayed on first client application 304, in addition to areas where the video clips should be displayed.

The system depicted in sequence diagram 1500 may allow a user providing inputs for an interactive video on first client device 104, for example a smart phone, to stream the interactive video to a second client device 106, for example a game controller, which can display the interactive video on a separate display 116, for example a television. This may allow one or more users to view the interactive video on a larger screen. It may also allow one or more additional users to interact with the interactive video.

In examples, the inputs may be received at a server application. For example, first or third client devices 104 or 108 may transmit updated input to the server device 102. This may, for example, allow the user to stream the frames of an interactive video from a server to a client device.

In examples, the updated input may be received at a first client application from a second client application. This may, for example, first client device 104 to receive a user input from second input device 112 or second client device 106.

FIG. 16 depicts sequence diagram 1600. The system depicted in sequence diagram 1600 may allow a user to provide inputs to a client device that are sent to a server, and to receive interactive video from a server in turn based on the inputs.

For example, sequence diagram 1600 depicts first client application 304 transmitting a first message 1602 to server application 302. In examples, first message 1602 may include user inputs. Server application 302 may transmit third message 1606 back to first client application. In examples, the third message may include one or more video clips or one or more video frames in response to the input provided in the first message. For example, third message 1606 may include the first video and the second video clip.

In examples, sequence diagram 1600 may further include a third client application 308. As may be seen in FIG. 16, third client application 308 may further transmit a second message 1604 to server application 302. Second message 1604 may include further inputs from an additional user. In response, sever application 302 may transmit third message 1606 to third client application 308 in addition to first client application 304. The system depicted in FIG. 16 may allow multiple users to interact with and display the same interactive video.

Figure 17:
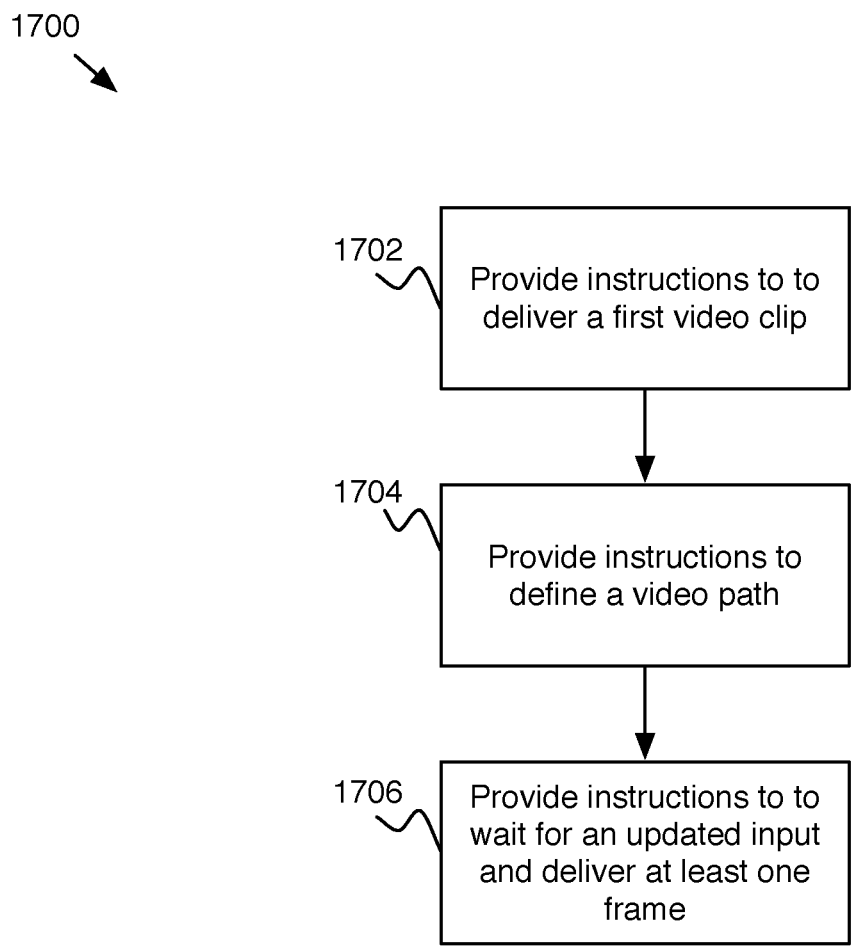
FIG. 17: depicts method 1700 in accordance with an embodiment of the invention.

FIG. 17 depicts method 1700, an example embodiment that may be used to generate an interactive video. Method 1700 begins with step 1702. In step 1702, instructions are provided to deliver a first video.

Providing instructions may include generating a script, source code, object code, or executable code to perform actions. In examples, the instructions may be created to run on a server device, a client device, or a combination thereof, as described above.

For example, step 1702 may provide the following example implementation of an interactive video. The example is provided in pseudo code, with comments noted by "//":
// Load the first video
queuebg("firstVideoClip.mov")
// Set the sound that will play when the user interacts with the object
setscrubbingsound("sound Effects.m4a")

Method 1700 continues with step 1704, where instructions are provided for a video path. For example, step 1704 may provide the following example implementation:
// Set up the beginning and end points for a linear path—first X and Y
// coordinates for the beginning point and then X and Y coordinates for the
// end point
setscrubbingpoints(605, 299, 580, 630)

Method 1700 continues with step 1706. In step 1706, instructions are provided to wait for an updated input and deliver at least one frame in response to the updated input.

For example, step 1706 may provide the following example implementation of an interactive video:
// After everything is set up, display interactive video and wait for input playqueuedbg( )

Because the methods may allow content creators make previously created video content interactive, it may be possible to both reduce the cost of creating content and increase the realism the consumer perceives over prior products using method 1700.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for delivering an interactive video including a first sequence of frames based on a first video clip associated with a pre-defined first video path, the method comprising:
    delivering a first frame of the first sequence of frames to entirely fill a display area;
    receiving a first user input at a first coordinate within the display area which corresponds to a first path position within the first video path, wherein the first video path includes a plurality of path positions, each path position is associated with a coordinate within the display area, and each path position corresponds to a different frame of the first video clip;
    receiving a second user input at a second coordinate within the display area which corresponds to a second path position within the first video path;
    determining an input velocity of the first user input and the second user input based on the first path position, the second path position and an input time interval corresponding to the first path position and the second path position;
    selecting, based on the determined input velocity of the first user input and the second user input, a plurality of frames for inclusion in the first sequence of frames from the frames associated with the path positions within the first video path between the first and second path positions; and
    delivering the plurality of frames in the first sequence of frames to entirely fill the display area at a default frame rate, wherein
        based on determining that the input velocity is greater than a threshold velocity, the plurality of frames in the first sequence of frames are delivered at the default frame rate while skipping the delivery of at least one frame of the plurality of frames in the first sequence, and based on determining that the input velocity is less than the threshold velocity, a first frame of the plurality of frames in the first sequence is delivered, a second frame of the plurality of frames in the first sequence that is adjacent to the first frame is delivered, and at least one additional frame between the first and second frames is delivered, wherein the first frame, the second frame and the at least one additional frame are delivered at the default frame rate.

2. A method as claimed in claim 1, wherein the first video clip includes live action video.

3. A method as claimed in claim 1, wherein the first sequence of frames includes a sub-sequence of frames from the first video clip.

4. A method as claimed in claim 1, wherein the second user input is within an engageable region of the first video path.

5. A method as claimed in claim 4, wherein the engageable region is dependent on a video path position.

6. A method as claimed in claim 4, wherein the second user input is further received within an engageable time period after the first user input.

7. A method as claimed in claim 4, wherein delivering the plurality of frames in the first sequence of frames includes delivering an engageable region clue.

8. A method as claimed in claim 1, wherein the second user input is received via a touch screen, a mouse, a pressure sensing device, an accelerometer, a gyroscope, a gesture recognition device, a joystick, or a game controller.

9. A method as claimed in claim 1, wherein the first frame of the first sequence of frames corresponds to a previous path position, and selecting the plurality of frames for inclusion in the first sequence of frames is further based on a path distance between the first path position and the second path position.

10. A method as claimed in claim 1, wherein the at least one additional frame is a frame that was not included in the first video clip.

11. A method as claimed in claim 10, wherein an engageable region is based on the first frame.

12. A method as claimed in claim 1, wherein the first frame and the plurality of frames include a begin frame and an end frame of the first video clip.

13. A method as claimed in claim 1, wherein the at least one additional frame includes a fading applied to the additional frame based on the input velocity and the threshold velocity.

14. A method as claimed in claim 1, wherein the at least one additional frame includes a plurality of frames interpolated based on the first frame and the second frame, and at least one of the interpolated frames includes a fading effect applied based on the input velocity and the threshold velocity.

15. A method as claimed in claim 1, wherein the at least one additional frame is an interpolated frame based on at least one of the first frame or the second frame.

16. A method as claimed in claim 15, wherein the interpolated frame includes a fading effect.

17. A method as claimed in claim 1, further comprising:
determining that the second path position is not an equilibrium path position;

selecting one or more equilibrium-restoring frames for inclusion in the first sequence of frames based on the second path position and the equilibrium path position; and delivering the equilibrium-restoring frames.

18. A method as claimed in claim 17, wherein a first intermediate frame of the equilibrium-restoring frames corresponds to the equilibrium path position and a second intermediate frame of the equilibrium-restoring frames corresponds to an overshot path position opposite the equilibrium path position from the second path position.

19. A method as claimed in claim 1, wherein selecting the plurality of frames for inclusion in the first sequence of frames is further based on a simulated physics in the first video path.

20. A method as claimed in claim 19, wherein selecting the plurality of frames for inclusion in the first sequence of frames based on the first frame, further includes:
determining that the second path position is not a final path position based on the simulated physics;
selecting one or more final approach frames for inclusion in the first sequence of frames based on the second path position and the simulated physics; and
delivering the one or more final approach frames.

21. A method as claimed in claim 20, wherein a first intermediate frame of the one or more final approach frames corresponds to the second path position and a second intermediate frame of the final approach frames corresponds to an overshot path position opposite the second path position from the first path position.

22. A method as claimed in claim 20, wherein the one or more final approach frames include a frame corresponding to an equilibrium path position.

23. A method as claimed in claim 1, further comprising:
upon determining that there is no subsequent input, delivering the first video clip at a constant playback speed.

24. A method as claimed in claim 1, further comprising:
delivering a background in a background area, wherein the interactive video delivers the first sequence of frames in an interactive video area.

25. A method as claimed in claim 24, wherein delivering the background includes delivering a background video.

26. A method as claimed in claim 24, wherein the interactive video area moves relative to the video display.

27. A method as claimed in claim 24, wherein the background area moves relative to the video display.

28. A method as claimed in claim 1, wherein the interactive video further includes delivering a second sequence of frames based on a second video in a second area.

29. A method as claimed in claim 1, wherein delivering the at least one frame includes displaying the at least one frame.

30. A system for delivering an interactive video including a first sequence of frames based on a first video clip comprising:
a memory configured to store the first sequence of frames; and
a processor configured to:
deliver a first frame of the sequence of frames to entirely fill a display area;
receive a first user input at a first coordinate within the display area which corresponds to a first path position within a first video path, wherein the first video path includes a plurality of path positions, each path position is associated with a coordinate within the display area, and each path position corresponds to a different frame of the first video clip;

receive a second user input at a second coordinate within the display area which corresponds to a second path position within the first video path;

determine an input velocity of the first user input and the second user input based on the first path position, the second path position and an input time interval corresponding to the first path position and the second path position;

selecting, based on the determined input velocity of the first user input and the second user input, a plurality of frames for inclusion in the first sequence of frames from the frames associated with the path positions within the first video path between the first and second path positions; and deliver the plurality of frames in the first sequence of frames to entirely fill the display area at a default frame rate, wherein based on determining that the input velocity is greater than a threshold velocity, the plurality of frames in the first sequence of frames are delivered at the default frame rate while skipping the delivery of at least one frame of the plurality of frames in the first sequence, and based on determining that the input velocity is less than the threshold velocity, a first frame of the plurality of frames in the first sequence is delivered, a second frame of the plurality of frames in the first sequence that is adjacent to the first frame is delivered, and at least one additional frame between the first and second frames is delivered, wherein the first frame, the second frame and the at least one additional frame are delivered at the default frame rate.

31. A method for creating an interactive video for delivery in accordance with the method of claim 1, the method comprising:

providing instructions to deliver a first video;

providing instructions for a video path comprising a plurality of path positions each corresponding to a coordinate within a display area; and providing instructions to wait for a user input and deliver the plurality of frames in response to the user input.

32. A method as claimed in claim 1, wherein the at least one additional frame includes the first frame or the second frame.

33. The system of claim 30, wherein the at least one additional frame includes the first frame or the second frame.

* * * * *